United States Patent
Lee et al.

(10) Patent No.: US 8,847,537 B2
(45) Date of Patent: Sep. 30, 2014

(54) MOTOR DRIVING DEVICE FOR ADJUSTING MOTOR SPEED AND SETTING THE LOWEST ROTATING SPEED AND THE DRIVING METHOD THEREOF

(71) Applicant: AMtek Semiconductor Co., Ltd., New Taipei (TW)

(72) Inventors: Teng-Hui Lee, New Taipei (TW); Kuo-Yung Yu, New Taipei (TW)

(73) Assignee: AMtek SEMICONDUCTOR Co., Ltd., New Taipei (TW)

( * ) Notice: Subject to any disclaimer, the term of this patent is extended or adjusted under 35 U.S.C. 154(b) by 176 days.

(21) Appl. No.: 13/706,195

(22) Filed: Dec. 5, 2012

(65) Prior Publication Data

US 2014/0077744 A1    Mar. 20, 2014

(30) Foreign Application Priority Data

Sep. 14, 2012 (TW) .............................. 101133600 A

(51) Int. Cl.
  *G05B 11/28* (2006.01)
  *H02P 7/29* (2006.01)
(52) U.S. Cl.
  CPC ........................................ *H02P 7/29* (2013.01)
  USPC ...... 318/599; 318/400.06; 318/779; 318/799; 318/811
(58) Field of Classification Search
  CPC ................................. G05B 11/28; H02P 7/29
  USPC .................. 318/66, 68, 90, 135, 146, 400.01, 318/400.06, 400.07, 400.14, 721, 727, 779, 318/799, 807, 810, 268, 276, 280, 504
  See application file for complete search history.

(56) References Cited

U.S. PATENT DOCUMENTS

| 6,879,120 B2 | 4/2005 | Xi |
| 7,710,214 B2 | 5/2010 | Li |
| 2008/0088268 A1* | 4/2008 | Sakaguchi .................... 318/471 |

FOREIGN PATENT DOCUMENTS

| TW | I290792 B | 12/2007 |
| TW | I364159 B | 5/2012 |

* cited by examiner

*Primary Examiner* — Antony M Paul
(74) *Attorney, Agent, or Firm* — Muncy, Geissler, Olds & Lowe, P.C.

(57) ABSTRACT

A motor driving device and a driving method thereof is disclosed herein and comprises a PWM converting circuit, an oscillator, a comparator, a controlling unit. The PWM converting circuit converts an analog signal according to an adjustable the highest setting voltage, an adjustable the lowest setting voltage and a controlling signal. The analog signal and a triangular signal generated by the oscillator are inputted to the comparator to compare to output a drive signal to the controlling unit so as to control the motor speed. The motor driving device in the present invention can adjust the motor rotating speed curve to set the lowest rotating speed of the motor so as to achieve the function of changing the motor rotating speed and maintain the lowest torque of the motor to increase the flexibility of the motor speed control.

20 Claims, 17 Drawing Sheets

MOTOR DRIVING DEVICE FOR ADJUSTING MOTOR SPEED AND SETTING THE LOWEST ROTATING SPEED AND THE DRIVING METHOD THEREOF

BACKGROUND OF THE INVENTION

1. Field of the Invention

The preset invention relates to a motor driving device and a driving method thereof, and more particularly relates to a motor driving device and a driving method thereof with the lowest rotating speed setting.

2. Description of the Prior Art

The conventional method is to implement Pulse Width Modulation (PWM) to control the motor driving, but it cannot have the function to adjust the rotating speed curve. The corresponding rotating speed of the motor output is based on the input Duty cycle. For example, please refer to FIG. 1, which is an output curve view illustrating the conventional PWM motor driving. As shown in FIG. 1, the Duty cycle of the PWM is 0% to 100%. When the Duty cycle of the PWM is 50%, the corresponding motor will output 50% rotating speed. Therefore, the control curve of the motor rotating speed will be a linear curve.

In order to achieve the lowest heat releasing request and reduce the noise signal or noise at the same motor loading, the motor is required to be in a predetermined speed when the Duty cycle of the PWM is lower to a predetermined value instead of stopping the motor rotating when the Duty cycle of the PWM is lower than the predetermined value.

However, when the user would like to change the motor rotating speed in accordance with the practical operation, the common method is to change the input PWM Duty cycle or the coil design of the motor. However, both of the methods are difficult to be operated practically. For example: if it would like to change the PWM Duty cycle inputted by the controller in accordance with the practical operation, the control method of the whole system is required to be changed; if it would like to change the coil of the motor, the motor is required to be replaced.

Therefore, a motor speed adjustable motor driving device and a driving method thereof is provided in the present invention. Not only adjusting a voltage among a highest setting voltage signal (VH), a lowest setting voltage signal (VL) and a triangular signal (TRI) but also adjusting the lowest rotating speed setting voltage signal to maintain the lowest torque of the motor to satisfy the request of the lowest heat releasing, the motor driving device can be adjusted to have the function of changing motor rotating speed and include the function of setting the lowest rotating speed so as to increase the implementing flexibility of the motor rotating speed controlled by the PWM.

SUMMARY OF THE INVENTION

In order to solve the problems described above, the main object of the present invention is to provide a motor driving device for adjusting motor rotating speed. The inputs of an adjustable highest setting voltage signal (VH), an adjustable lowest setting voltage signal (VL) and a controlling signal are converted to be an analog signal (VTH). The analog signal (VTH) is compared with a triangular signal (TRI) generated by an oscillator by a comparator and an adjustable lowest rotating speed setting voltage signal to generate an output driving signal. The output driving signal is transmitted to a controlling unit to control the motor rotation speed. The different motor rotating speed curves can be adjusted by the motor driving device in the present invention to achieve the purpose of changing motor rotation speed and increase a flexibility of the control of the motor rotating speed.

Another object of the present invention is to provide a motor driving method for adjusting motor rotating speed by adjusting the adjustable highest setting voltage signal (VH), the adjustable lowest setting voltage signal (VL) and the triangular signal (TRI) to adjust the motor rotating speed curves so as to change the function of the motor rotating speed.

According to objects above, the present invention disclosed a motor driving device with motor speed control and the motor driving device with motor speed control includes a pulse width modulator, an oscillator, a comparator and a controlling unit. The pulse width modulator (PWM) converting circuit includes a first input end, a second input end, a third input end and an output end, wherein the first input end is connected to a controlling signal, the second input end is connected to an adjustable highest setting voltage signal (VH), the third input end is connected to an adjust lowest setting voltage signal (VL) and the output end is to output an analog signal, and the analog signal is changeable in accordance with the controlling signal, the adjustable highest setting voltage signal (VH) or the adjust lowest setting voltage signal (VL). The oscillator is configured to generate a triangular signal. The comparator includes a first input end connected to the triangular signal of the oscillator and a second input end connected to the analog signal of the PWM converting circuit and an output end is to output a driving signal. The controlling unit is configured to receive the driving signal to control a motor.

A motor driving method for adjusting a motor rotating speed is provided in the present invention and includes the following steps: a step of providing a PWM converting circuit and the PWM converting circuit includes a first input end, a second input end, a third input end and an output end, wherein the first input end is connected to an PWM signal, the second input end is connected to an adjustable highest setting voltage (VH), the third input is connected to an adjustable lowest setting voltage (VL) and the output end is to output an analog signal; a step of providing a oscillator to generate a triangular signal; and a step of providing a comparator, and the comparator includes a first input end connected to the triangular signal of the oscillator and a second input end connected to the analog signal of the PWM converting circuit and an output end is to output a driving signal. The analog signal can be changed by adjusting the PWM signal, the adjustable highest setting voltage (VH) or the adjustable lowest setting voltage (VL).

By the motor driving device for adjusting a motor rotating speed and a driving method thereof, the motor driving device can generate an analog signal by adjusting an adjustable highest setting voltage signal (VH), an adjustable lowest setting voltage signal (VL) and a controlling signal. The analog signal is compared with a triangular signal (TRI) generated by an oscillator by a comparator to generate a output driving signal. The output driving signal is transmitted to a controlling unit to control the motor rotation speed. The different motor rotating speed can be adjusted by the motor driving device in the present invention to increase a flexibility of the application of the motor.

DETAILED DESCRIPTION OF THE INVENTION

The present invention is to provide a motor driving device and a driving method thereof. An adjustable highest setting voltage signal (VH), an adjustable lowest setting voltage signal (VL) and a controlling signal is converted to be an analog signal (VTH) by a PWM converter. The analog signal (VTH) is compared with a triangular signal (TRI) generated by an oscillator and the lowest rotating speed setting voltage signal by a comparator to generate an output driving signal. The output driving signal is transmitted to a controlling unit to control the motor rotation speed. The different motor rotating speed curves can be adjusted by the motor driving device in the present invention to achieve the purpose of changing motor rotation speed and increase a flexibility of the control of the motor rotating speed. The basic principle and function of the motor in the present invention is well known by a person in the art. The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

Figure 1:
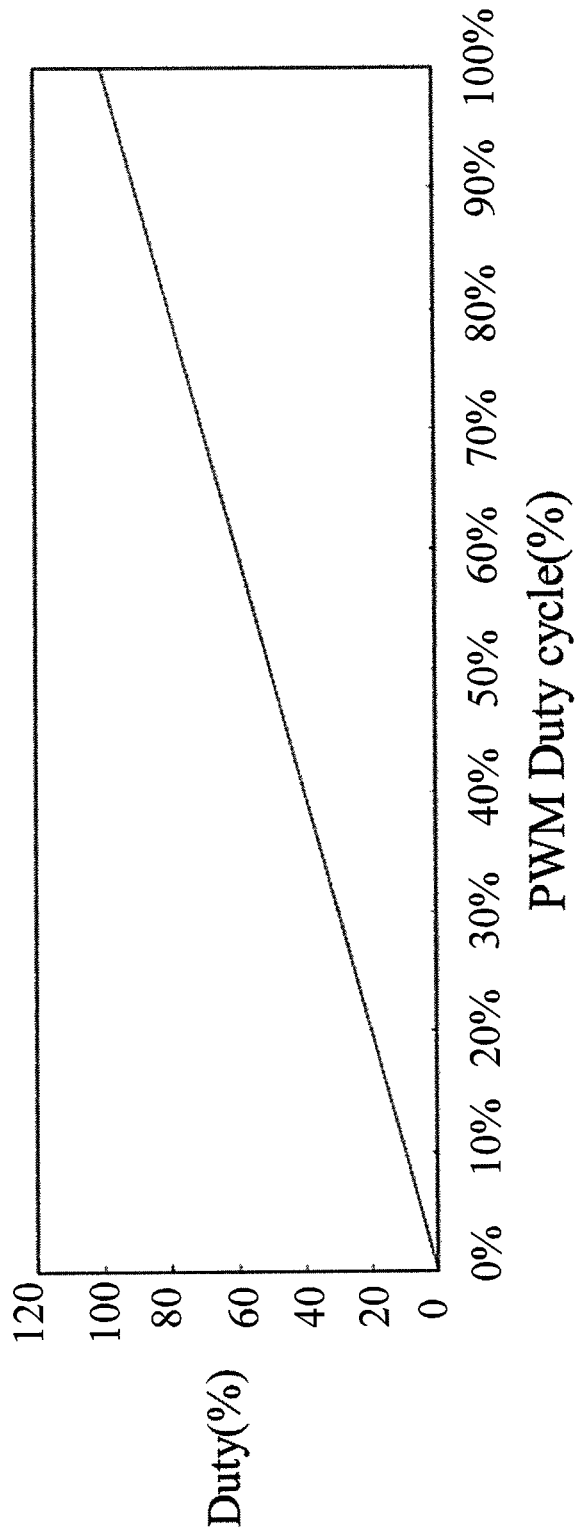
FIG. 1 is an output curve view illustrating the conventional PWM controls motor driving.
Figure 2:
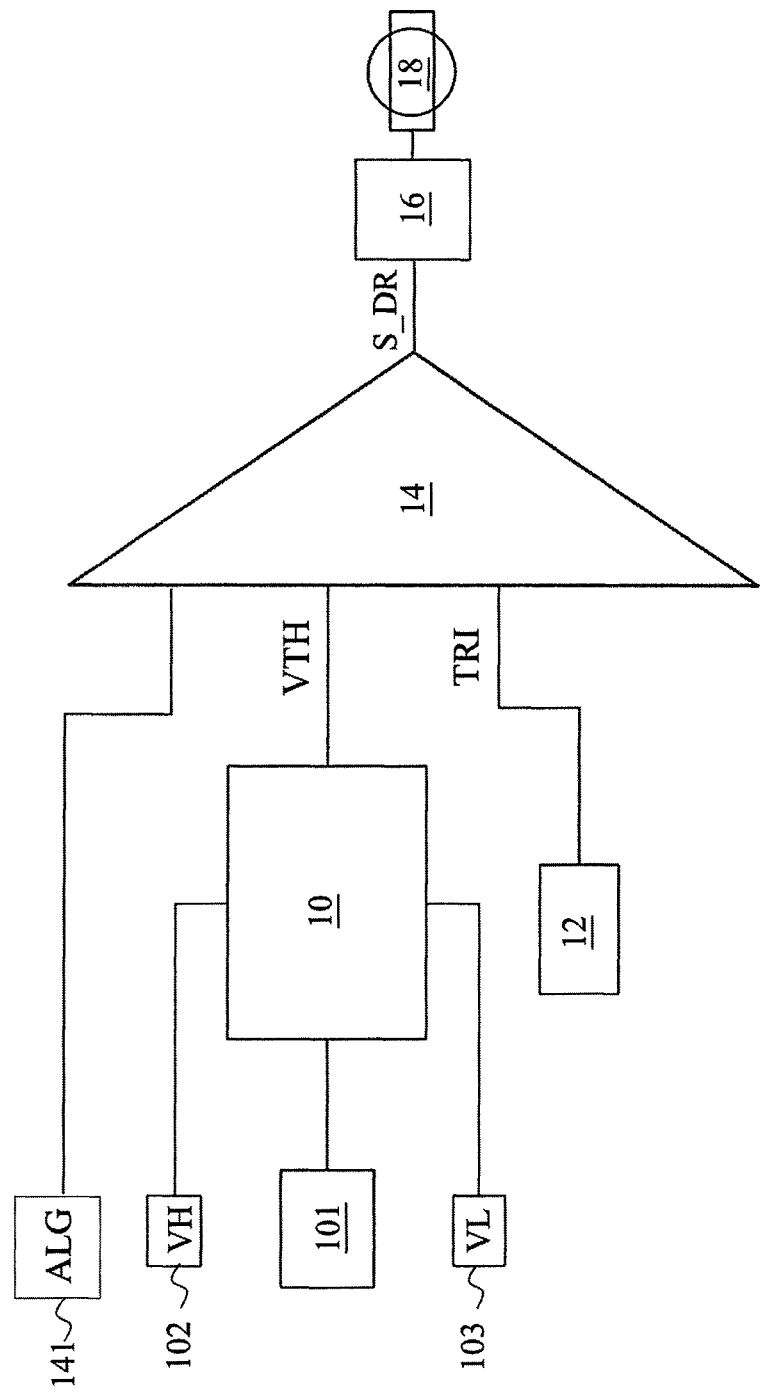
FIG. 2 is a structural view illustrating a motor driving device in the present invention.

Firstly, please refer to FIG. 2, which is a structural view illustrating a motor driving device in the present invention. As shown in FIG. 2, the motor driving device includes a PWM converting circuit 10, an oscillator 12, a comparator and a controlling unit 16. The PWM converting circuit includes a first input end, a second input end, a third input end and an output end. The first input end is connected to a controlling signal 101. The second input end is connected to an adjustable highest setting voltage signal (VH) 102. The third input end is connected to an adjustable lowest setting voltage signal (VL) 103 and the output end is to output an analog signal (VTH). The controlling signal is a PWM signal (such as: a PWM signal provided by a personal computer) and the analog signal can be varied by adjusting the adjustable highest setting voltage signal or the adjustable lowest setting voltage signal by adjusting the controlling signal. The oscillator 12 is configured to generate a triangular signal (TRI) and the triangular signal is adjustable between a high voltage level and a low voltage level. The comparator 14 includes a first input end, a second input end, a third input end and an output end. The first input end is connected to the triangular signal of the oscillator 12 and the second input end is connected to the analog signal of the PWM converting circuit 10. The third input end is to receive an adjustable lowest rotating speed setting voltage signal 141 and the output end is to output a driving signal (S_DR). The controlling unit 16 is configured to receive the driving signal (S_DR) to control a motor 18. The motor 18 is a single phase motor and a three phase motor.

Figure 3:
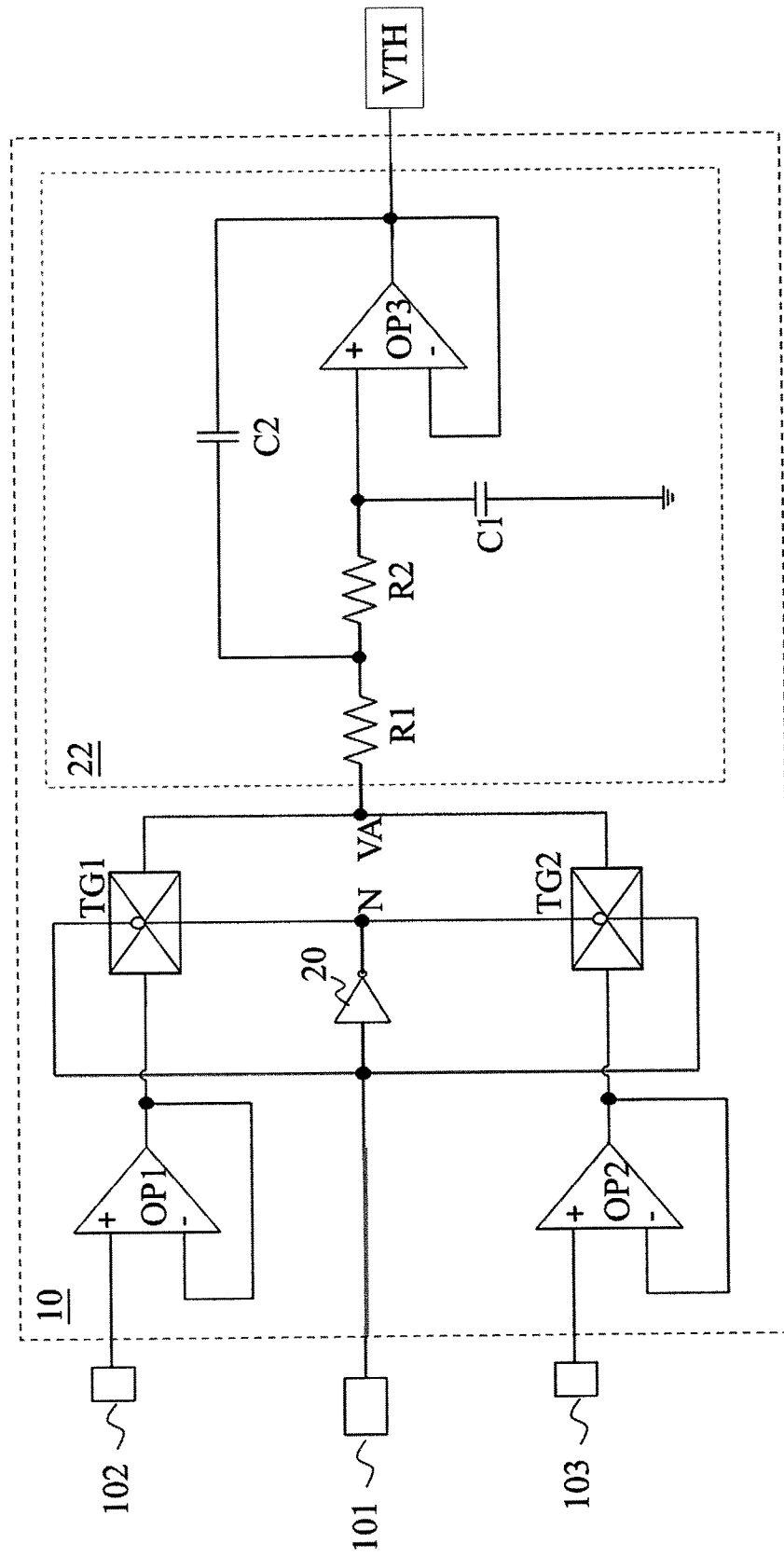
FIG. 3 is a view illustrating the PWM converting circuit in the present invention.

Now, please refer to FIG. 3, which is a view illustrating the PWM converting circuit in the present invention. As shown in FIG. 3, the PWM converting circuit 10 includes a first input end, a second input end, a third input end and an output end. The first input end is connected to a controlling signal 101. The second input end is connected to an adjustable highest setting voltage signal (VH) 102. The third input end is connected to an adjustable lowest setting voltage signal (VL) 103 and the output end is to output an analog signal (VTH). The controlling signal is a PWM signal (such as: a PWM signal provided by a personal computer) and the analog signal can be varied by adjusting the adjustable highest setting voltage signal or the adjustable lowest setting voltage signal by adjusting the controlling signal. The PWM converting circuit 10 further includes a first operating amplifier (OP1) and a second operating amplifier (OP2), a first switch (TG1) and a second switch (TG2), a inverter 20 and a low pass filter 22. The OP1 includes a positive input end, a negative input end and an output end. The positive input end is electrically connected to the adjustable highest setting voltage signal 102 and the output end is electrically connected to the negative input end. The OP2 includes a positive input end, a negative input end and an output end. The positive input end is electrically connected to the adjustable lowest setting voltage signal 103 and the output end is electrically connected to the negative input end. The first switch (TG1) includes a first input end, an output end, a controlling end and a connecting end. The input end configured to receive a first input signal is connected to the OP1. The output end is connected to an output end in an output node (VA). The controlling end is connected to the controlling signal 101 and the connecting end is connected to a common node (N). The TG1 is configured to determine if the first input signal is conducted in accordance with the controlling signal 101. The TG1 is a transmitting gate. The TG2 includes an input end, an output end, a controlling end and a connecting end. The input end configured to receive a second input signal is connected to the OP2. The output end is connected to the output node (VA). The controlling end is connected to the controlling signal 101 and the connecting end is connected to the common node (N). The TG2 is configured to determine if the second input signal is conducted in accordance with the controlling signal 101. The TG2 is a transmitting gate. The inverter 20 includes an input end configured to receive the controlling signal 101 and an output end connected to the common node (N). The low pass filter 22 is a two-step low pass filter and further includes a first resistor (R1), a second resistor (R2), a first capacitance (C1), a third operating amplifier (OP3), a second capacitance (C2). The first resistor (R1) includes a first end connected to the output node (VA) and a second end. The second resistor (R2) includes a first end and a second end connected to the first resistor (R1). The first capacitance (C1) includes a first end connected to the second resistor (R2) and a second end connected to the ground. The OP3 includes a positive input end connected to the second resistor (R2), a negative input end and an output end connected to the negative input end. The second capacitance (C2) includes a first end connected to a node between the first resistor (R1) and the second resistor (R2) and a second end connected to the output end of the OP3.

When the controlling signal 101 is inputted from the first input end of the PWM converter 10 to the PWM converter 10, the controlling signal 101 is converted to be an analog signal (VTH) in accordance with the adjustable highest setting voltage (VH) 102 inputted by the second input end of the PWM converter 10 and the adjustable lowest setting voltage (VL) inputted by the third input end of the PWM converter 10. The controlling signal 101 is a PWM signal and the Duty cycle thereof is 0% to 100%. The adjustable highest setting voltage (VH) 102 and the adjustable lowest setting voltage (VL) 103 are determined by the external input. After determining by the external input, the adjustable highest setting voltage (VH) 102 is transmitted to the positive input end of the OP1 and is calculated by the OP1 to output the first output signal from the output end to the input end of the TG1. The adjustable lowest setting voltage (VL) 103 is transmitted to the positive input end of the OP2 and is calculated by the OP2 to output the second output signal from the output end to the input end of the TG2. The controlling signal 101 will connect to the input end of the inverter 20, the controlling end of the TG1 and the controlling end of the TG2. The adjustable highest setting voltage (VH) 102 is controlled by the controlling signal 101 and calculated by the OP2 to output to the output node (VA). Or, the adjustable lowest setting voltage (VL) 103 is calculated by the OP2 to output to the output node (VA). Then, the adjustable highest setting voltage (VH) 102 or the adjustable lowest setting voltage (VL) 103 is sampled by the low pass filter 22 to covert to be an analog signal (VTH) to output to the comparator 14 so as to control the motor 18.

Figure 4:
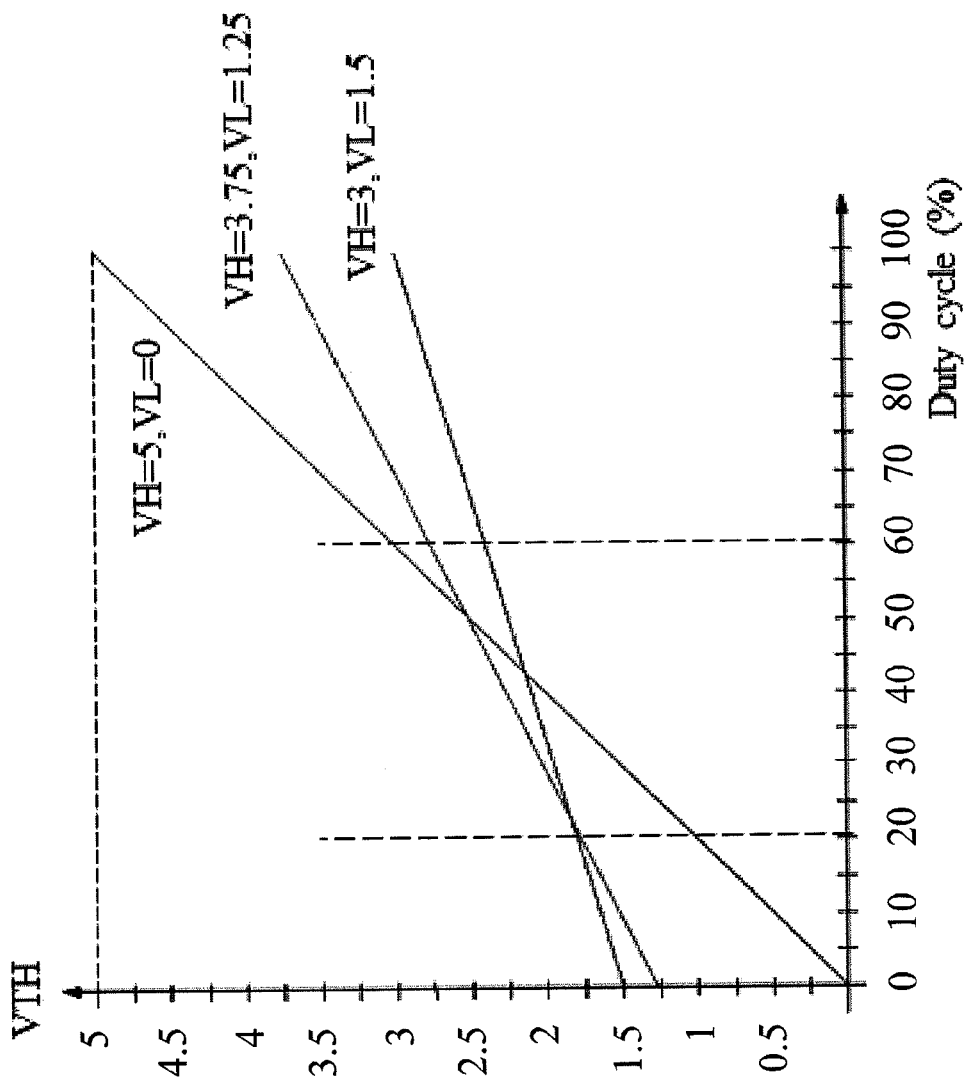
FIG. 4 is a view illustrating the output result of the converted analog signal (VTH) in the present invention.

Now, please refer to FIG. 4 and FIG. 3 in conjunction, FIG. 4 is a view illustrating the output result of the converted analog signal (VTH) in the present invention. As shown in FIG. 4, the analog signal (VTH) is converted and outputted by the controlling signal to control the adjustable highest setting voltage (VH) 102 or the adjustable lowest setting voltage (VL) 103 by the controlling signal to the output node (VA). The analog signal (VTH) is converted by a conversion equation and the conversion equation is shown in the following equation (1):

$$VTH=(VH-VL)\times(\text{Duty cycle})+VL \qquad (1)$$

However, the different adjustable highest setting voltage (VH) or the different adjustable lowest setting voltage (VL) can be converted by the conversion equation to generate a result with different analog signal (VTH). For example, if the Duty cycle of the inputted controlling signal is fixed to be 20%, the Duty cycle of the PWM signal is fixed to be 20%. It is observed to set the analog signal (VTH) generated by the different adjustable highest setting voltage (VH) or the different adjustable lowest setting voltage (VL). For example: when setting the adjustable highest setting voltage (VH)=5V and the adjustable lowest setting voltage (VL)=0V, the conversion equation is used to convert and output the analog signal=1V; when setting the adjustable highest setting voltage (VH)=3.75V and the adjustable lowest setting voltage (VL)=1.25V, the conversion equation is used to convert and output the analog signal=1.75V; when setting the adjustable highest setting voltage (VH)=3V and the adjustable lowest setting voltage (VL)=1.5V, the conversion equation is used to convert and output the analog signal=1.8V.

If the Duty cycle of the inputted controlling signal (the PWM signal) is fixed to be 60%, it is observed to set the analog signal (VTH) generated by the different adjustable highest setting voltage (VH) or the different adjustable lowest setting voltage (VL). For example: when setting the adjustable highest setting voltage (VH)=5V and the adjustable lowest setting voltage (VL)=0V, the conversion equation is used to convert and output the analog signal=3V; when setting the adjustable highest setting voltage (VH)=3.75V and the adjustable lowest setting voltage (VL)=1.25V, the conversion equation is used to convert and output the analog signal=2.75V; when setting the adjustable highest setting voltage (VH)=3V and the adjustable lowest setting voltage (VL)=1.5V, the conversion equation is used to convert and output the analog signal=2.4V. According to description above, when the Duty cycle of the controlling signal (the PWM signal) is changed from 0% to 100%, the generating result of the analog signal (VTH) by the conversion equation will show a linear change. However, by adjusting the controlling signal, the adjustable highest setting voltage (VH) or the adjustable lowest setting voltage (VL) to covert the analog signal, the analog signal is compared to the triangular signal (TRI) generated by the oscillator 12 to output a driving signal. The driving signal is used to generate different rotating speed Duty % to control the motor rotating so as to achieve the function to change the rotating speed of the motor.

Figure 5A:
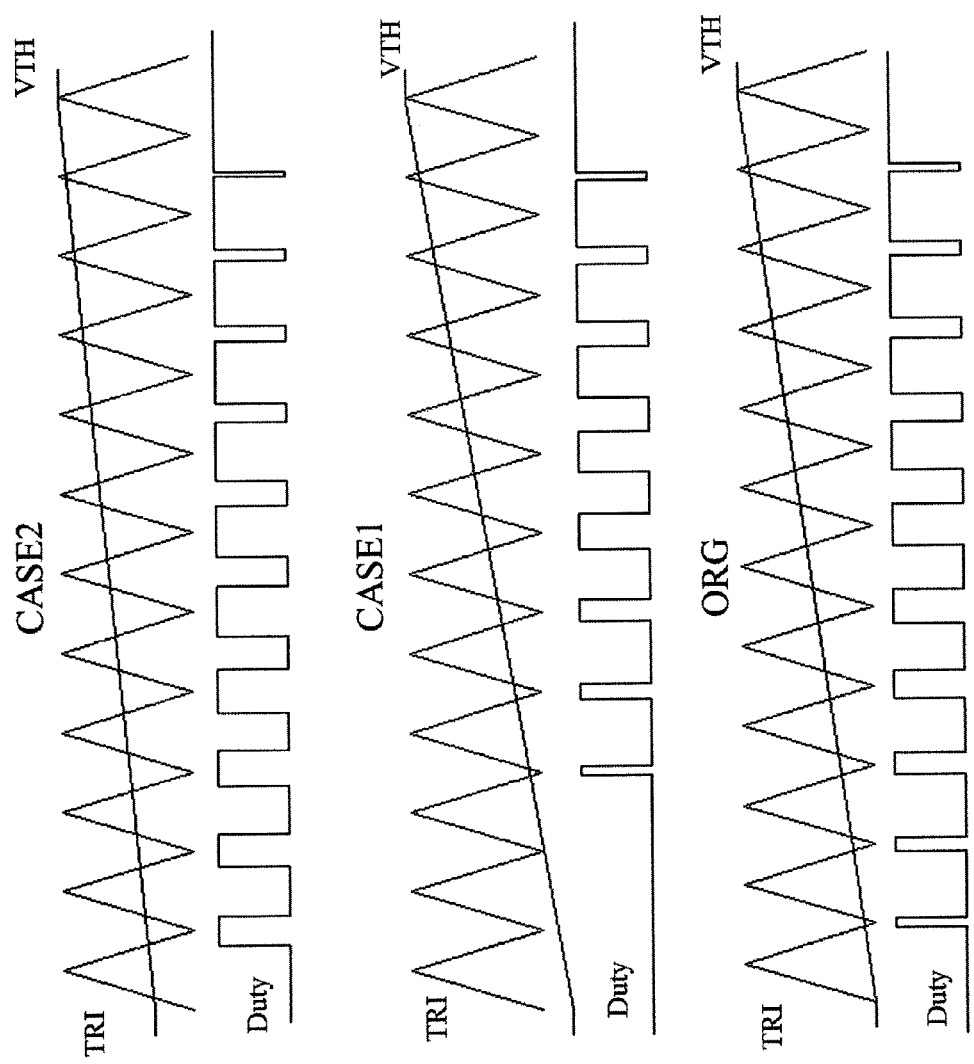
FIG. 5A is a waveform view in the first embodiment of the present invention.

Therefore, please refer to FIG. 5A, FIG. 5A is a waveform view in the first embodiment of the present invention. As shown in FIG. 5A, the first embodiment is to fix the high voltage of the triangular signal (TRI) to be 3.75V and the low voltage thereof to be 1.25V and the adjustable highest setting voltage is fixed to be 3.75V to adjust the adjustable lowest setting voltage, the analog signal (VTH) generated by the conversion equation is compared with the triangular signal (TRI) to observe the output rotating speed Duty %. Therefore, three conditions are divided herein to describe the comparing result: ORG(VH=3.75V, VL=1.25V), CASE1(VH=3.75V, VL=0V), CASE2(VH=3.75V, VL=2.25V). Firstly, if it is in ORG condition, the high voltage and the low voltage of the triangular signal is respectively fixed to be 3.75V and 1.25V, the adjustable lowest setting voltage (VL) is 1.25V, the converting result of the analog signal (VTH) by the conversion equation is varied between 1.25V and 3.75V and the analog signal is compared with the triangular signal (TRI) to observe the output rotating Duty %. The result is shown in the ORG waveform view of FIG. 5A. Because the result of the analog signal (VTH) is the same as the high voltage and the low voltage of the triangular signal (TRI), the output rotating speed Duty % is leaner changes. Secondly, if it is in CASE1 condition, the high voltage and the low voltage of the triangular signal is respectively fixed to be 3.75V and 1.25V, the adjustable lowest setting voltage (VL) is 0V, the converting result of the analog signal (VTH) by the conversion equation is varied between 0V and 3.75V and the analog signal is compared with the triangular signal (TRI) to observe the output rotating Duty %. The result is shown in the CASE1 waveform view of FIG. 5A. Because the analog signal (VTH)

is changed from 0V, the analog signal (VTH) is changed to be 1.25 to contact the triangular signal (TRI), the output rotating speed Duty % is started to generate. Therefore, there is no output rotating speed when the analog signal is between 0V and 1.25V. In addition, if it is in CASE2 condition, the high voltage and the low voltage of the triangular signal is respectively fixed to be 3.75V and 1.25V, the adjustable lowest setting voltage (VL) is 2.25V, the converting result of the analog signal (VTH) by the conversion equation is varied between 2.25V and 3.75V and the analog signal is compared with the triangular signal (TRI) to observe the output rotating Duty %. The result is shown in the CASE2 waveform view of FIG. 5A. When the analog signal (VTH) is 2.25V to contact the triangular signal (TRI), the voltage of the analog signal (VTH) is higher than the low voltage (1.25V) of the triangular signal (TRI). Therefore, in CASE2, the output rotating speed Duty % will exist at the beginning. The output rotating speed Duty % is started to generate.

Figure 5B:
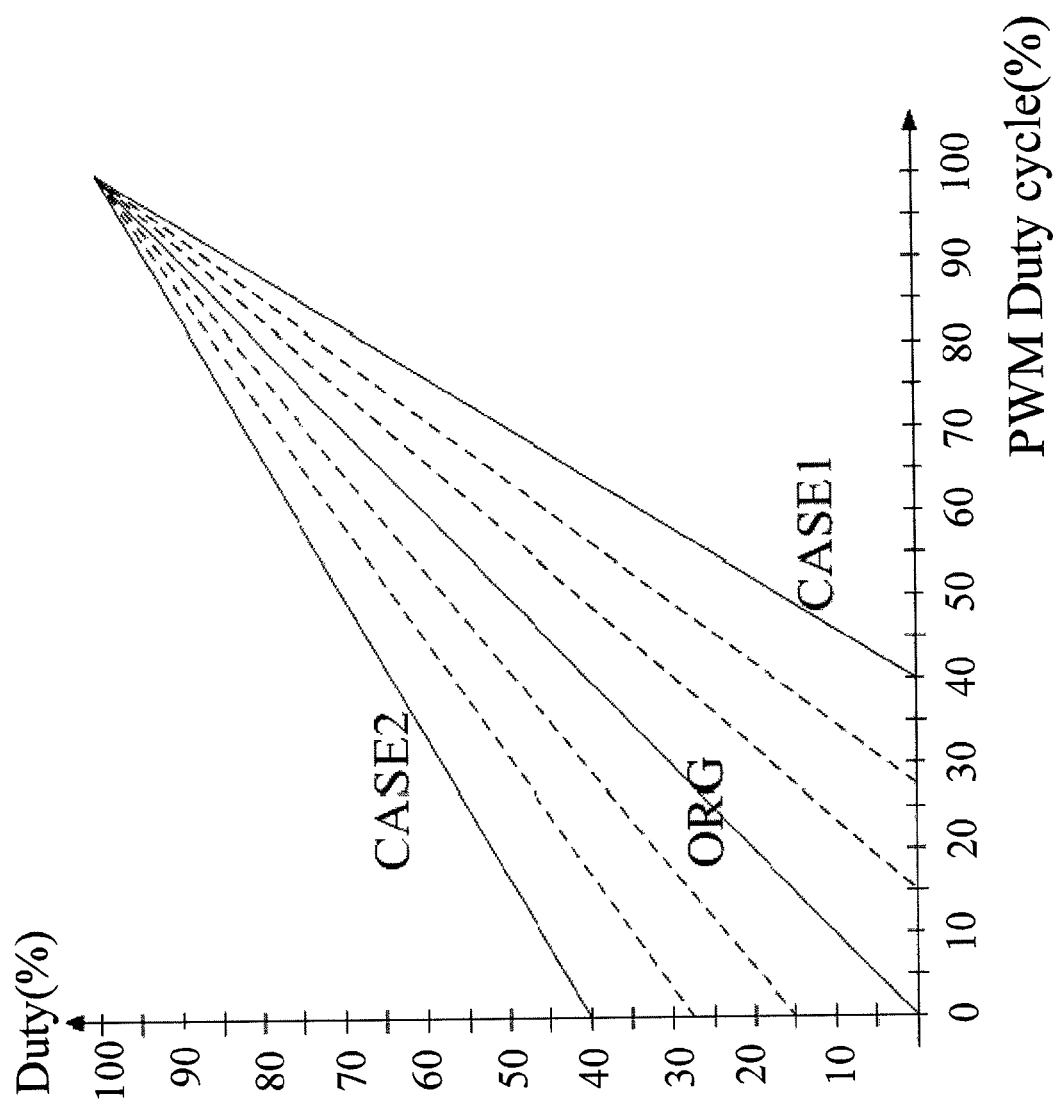
FIG. 5B is a rotating speed curve diagram in the first embodiment of the present invention.

Thereafter, the three conditions ORG (VH=3.75V, VL=1.25V), CASE1 (VH=3.75V, VL=0V) and CASE2 (VH=3.75V, VL=2.25V) are converted to be a rotating speed curve in accordance with the Duty cycle of the controlling signal (PWM signal). Please refer to FIG. 5B and FIG. 5A in conjunction, as shown in FIG. 5B, it is a rotating speed curve diagram in the first embodiment of the present invention. The horizontal line axis is the Duty cycle % of the controlling signal (PWM signal) and the vertical line is the motor output rotating speed Duty %. In ORG condition, it is to observe the variation of the rotating speed curve when the Duty cycle is between 0% and 100%. As the description in FIG. 5A, the result of the analog signal (VTH) is the same as the high voltage and the low voltage of the triangular signal (TRI) and the motor output rotating speed curve is linear changes. Then, in CASE1 condition, it is to observe the variation of the rotating speed curve when the Duty cycle is between 0% and 100%. As the description in FIG. 5A, the analog signal (VTH) is begun to change from 0V, the analog signal (VTH) is contacted the triangular signal (TRI) and the output rotating speed Duty % is existed when the analog signal (VTH) is 1.25V. Therefore, there is no output rotating speed Duty % when the analog signal (VTH) is between 0V and 1.25V. As the CASE1 rotating speed curve in FIG. 5B, when the Duty cycle is 33%, the motor would begin to output rotating speed. In CASE2 condition, it is to observe the variation of the rotating speed curve when the Duty cycle is changed between 0% and 100%. As the description in FIG. 5A, when the analog signal (VTH) is 2.25V, the analog signal is contacted with the triangular signal (TRI) and the voltage level thereof is higher than the low voltage 1.25V of the triangular signal (TRI). Therefore, the output of the motor rotating speed is existed at the beginning. As the CASE2 rotating speed curve in FIG. 5B, when the Duty cycle is 0%, the motor output rotating speed Duty % is 40%. In summary, the first embodiment can be implemented to adjust in accordance with different motors or different systems on minimum speed area when the motor rotating speed is lower than a predetermined level. When the motor is required to maintain the lowest thermal dissipating, it is to adjust to CASE2 setting. If the system is not required to do heat dissipating but required in energy saving mode, it is to adjust to CASE1 setting. As the PWM signal is lower than 33%, which is adjusted by the system requirement, the motor will not output signals. According to the two system requirements, it is to adjust the adjustable lowest setting voltage (VL) to adjust the motor output at low rotating speed (as the dot line in FIG. 5B). However, in order to avoid that the motor is stopped when the motor rotating speed is lower than a predetermined condition, the motor is desired to keep in a predetermined rotating speed. By the function of setting the lowest rotating speed, the motor is controlled to maintain in the lowest heat releasing request and includes a power saving function.

Figure 6A:
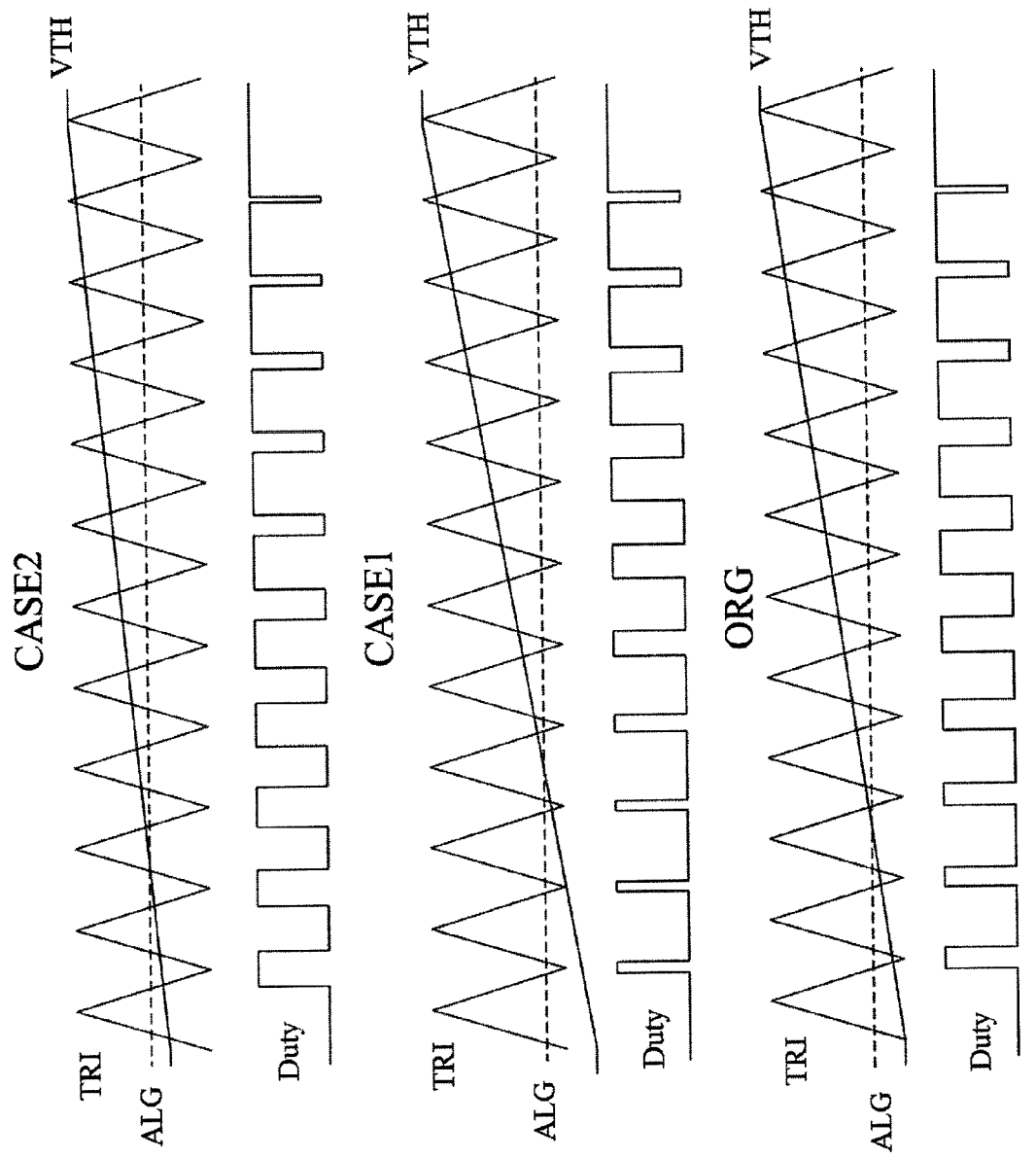
FIG. 6A is a waveform diagram in the first embodiment with an extra adjustable lowest rotating speed setting of the present invention.

Now, please refer to FIG. 6A, it is a waveform diagram illustrating the first embodiment includes an extra lowest rotating speed setting in the present invention. In order to described clearly, the adjusting range of CASE1 and CASE2 in FIG. 5B is decreased from 40% DUTY to 20% DUTY, as the lot line in FIG. 6B. Please refer to FIG. 6A, an adjustable lowest rotating speed setting voltage signal (ALG) is included in three conditions: ORG (VH=3.75V, VL=1.25V), CASE1 (VH=3.75V, VL=0.625V) and CASE2 VH=3.75V, VL=1.75V) and it is compared with the analog signal (VTH) converted by the converting equation and the triangular signal (TRI) to determine the output rotating speed ration (Duty %). As shown in FIG. 6A, if it is in ORG condition, the high voltage and the low voltage of the triangular signal is respectively fixed to be 3.75V and 1.25V, the adjustable highest setting voltage (VH) is 3.75V, the adjustable lowest setting voltage (VL) is 1.25V and the extra adjustable lowest rotating speed setting voltage signal (ALG) is 2V, the converting result of the analog signal (VTH) by the conversion equation is varied between 1.25V and 3.75V and the analog signal is compared with the triangular signal (TRI) and the extra adjustable lowest rotating speed setting voltage signal (ALG) to observe the output rotating Duty %. The result is shown in the ORG waveform view of FIG. 6A. Please refer to the ORG waveform diagram in FIG. 6A and the ORG waveform diagram in FIG. 5A in conjunction, because the result of the analog signal (VTH) is the same as the high voltage and the low voltage of the triangular signal (TRI), which is varied between 1.25V and 3.75, when the adjustable lowest rotating speed setting voltage signal (AL) is set to be 2V, the motor can be operated in the lowest rotating speed. Therefore, when the analog signal (VTH) is lowest than the voltage level 2V of the adjustable lowest rotating speed setting voltage signal (ALG), the rotating speed ration (Duty %) is outputted in accordance with the adjustable lowest setting voltage signal (ALG). When the analog signal (VTH) is larger than the voltage level 2V of the adjustable lowest setting voltage signal, the analog signal (VTH) is compared with the triangular signal (TRI) to output the rotating speed (Duty %) and the output rotating speed Duty % is leaner changes. Secondly, if it is in CASE1 condition, the high voltage and the low voltage of the triangular signal is respectively fixed to be 3.75V and 1.25V, the adjustable highest setting voltage (VH) is 3.75V, the adjustable lowest setting voltage (VL) is 0.625V, the converting result of the analog signal (VTH) by the conversion equation is varied between 0.625V and 3.75V and the analog signal is compared with the triangular signal (TRI) and the extra adjustable lowest rotating speed setting voltage signal (ALG) to observe the output rotating Duty %. The result is shown in the CASE1 waveform view of FIG. 6A. Please refer to the CASE1 waveform in FIG. 6A and the CASE1 waveform in FIG. 5A in conjunction, because the analog signal (VTH) is changed from 0V and the analog signal is contacted the triangular signal (TRI) when the analog signal is 1.25V and it is to output the rotating speed ratio (Duty %). In order to avoid stopping the motor rotating and rotating speed ratio (Duty %) outputting, the adjustable lowest rotating speed setting voltage signal (ALG) is set to be 1.75V to control the motor in the lowest rotating speed. When the analog signal (VTH) is smaller than the voltage level 1.75V of the adjustable lowest rotating speed setting voltage signal (ALG), the rotating speed ration (Duty %) is outputted in accordance with the adjustable lowest rotating speed setting voltage signal (ALG). When the analog signal (VTH) is larger than the voltage level 1.75V of the adjustable lowest rotating setting voltage signal (ALG), the adjustable lowest rotating setting voltage signal (ALG) is compared with the analog signal (VTH) and the triangular signal (TRI) and the result is linear change. Moreover, when it is in CASE2 condition, the high voltage and the low voltage of the triangular signal is respectively fixed to be 3.75V and 1.25V, the adjustable highest setting voltage (VH) is 3.75V, the adjustable lowest setting voltage (VL) is 1.75V and the adjustable lowest rotating speed setting voltage signal (ALG) is 2.25V, the converting result of the analog signal (VTH) by the conversion equation is varied between 1.75V and 3.75V and the analog signal is compared with the triangular signal (TRI) and the adjustable lowest rotating speed setting voltage signal (ALG) to observe the output rotating Duty %. The result is shown in the CASE2 waveform view of FIG. 6A. Please refer to refer to CASE2 waveform view of FIG. 6A and the CASE2 waveform view of FIG. 5A, when the analog signal (VTH) is 1.75V, it is contacted the triangular signal (TRI) and the voltage level thereof is highest than the lowest voltage 1.25V of the triangular signal (TRI). Therefore, in CASE2 condition, the rotating speed ration (Duty %) is outputted at the beginning. However, if the motor generates too much heat to increase the temperature, in order to satisfy the heat releasing request, the adjustable lowest rotating speed setting voltage signal (ALG) is set to be 2.25V to control the motor to keep in the lowest rotating speed to adjust the temperature. When the analog signal (VTH) is smaller than the voltage level 2.25V of the adjustable lowest rotating speed setting voltage signal (ALG), the rotating speed ratio (Duty %) is outputted in accordance with the adjustable lowest rotating speed setting voltage signal (ALG). When the analog signal is larger than the adjustable lowest rotating speed setting voltage signal (ALG), the rotating speed ratio (Duty %) is outputted in accordance with the comparing result of the adjustable lowest rotating speed setting voltage signal (ALG), analog signal (VTH) and the triangular signal (TRI).

Figure 6B:
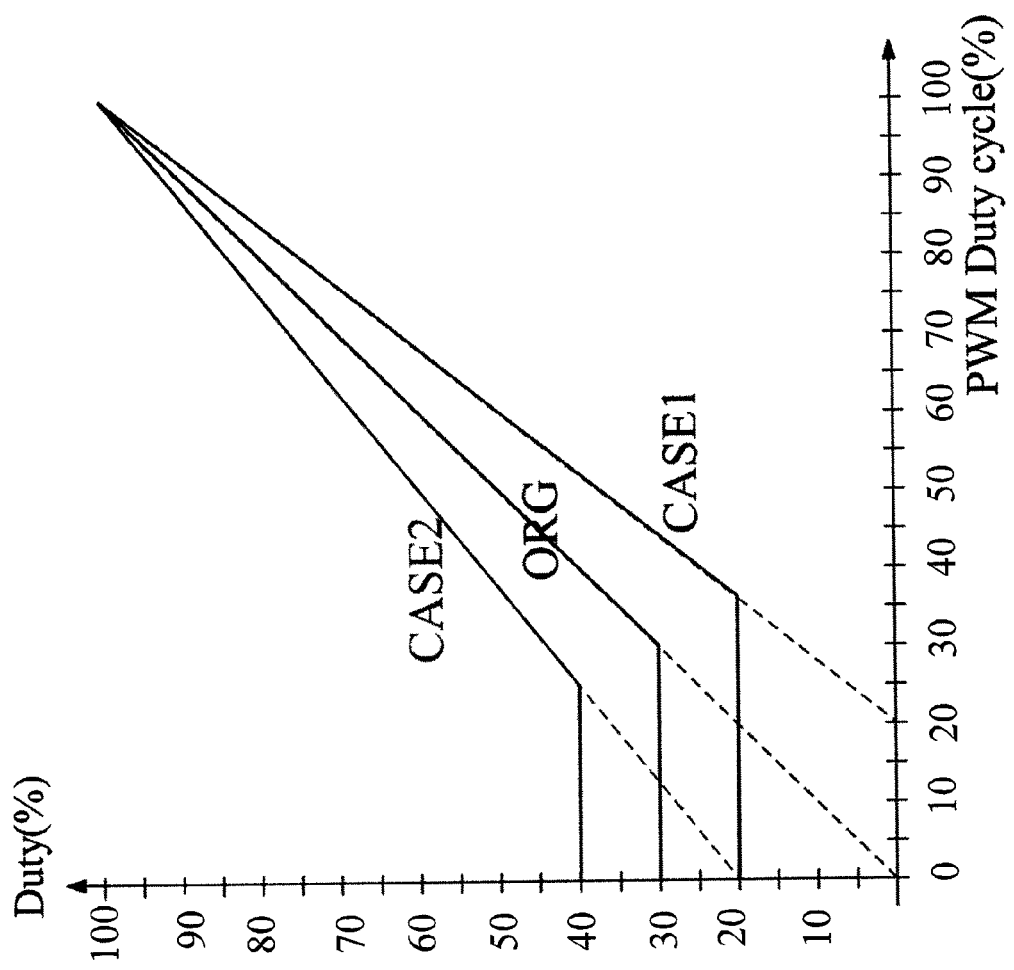
FIG. 6B is a rotating speed curve diagram in the first embodiment with an extra adjustable lowest rotating speed setting of the present invention.

Thereafter, the three conditions ORG (VH=3.75V, VL=1.25V), CASE1 (VH=3.75V, VL=0.625V) and CASE2 (VH=3.75V, VL=1.75V) are converted to be a rotating speed curve in accordance with the Duty cycle of the controlling signal (PWM signal). Please refer to FIG. 6B and FIG. 6A in conjunction, as shown in FIG. 6B, it is a rotating speed curve diagram in the second embodiment of the present invention. The horizontal axis is the Duty cycle % of the controlling signal (PWM signal) and the vertical axis is the motor output rotating speed Duty %. In ORG condition, it is to observe the variation of the rotating speed curve when the Duty cycle is between 0% and 100%. As the description in FIG. 6A and FIG. 6B in conjunction, the result of the analog signal (VTH) is the same as the high voltage and the low voltage of the triangular signal (TRI) and the motor output rotating speed curve is linear change. When the adjustable lowest rotating speed setting voltage signal (ALG) is set to be 2V, the motor is operated in the lowest rotating speed. When the analog signal (VTH) is smaller than the voltage level 2V of the adjustable lowest rotating speed setting voltage signal (ALG), the rotating speed ratio (Duty %) is maintained in 30%. When the analog signal (VTH) is larger than the voltage level 2V of the adjustable lowest rotating speed setting voltage signal (ALG) (after Duty % is 30%), the output of the rotating speed ratio (Duty %) is linear change. Then, in CASE1 condition, it is to observe the variation of the rotating speed curve when the Duty cycle is between 0% and 100%. According to FIG. 6A and FIG. 6B, when the analog signal (VTH) is 0.625V, the analog signal (VTH) is not contacted the triangular signal (TRI) and the output rotating speed Duty % is existed when the analog signal (VTH) is 1.25V. In order to avoid stopping the motor rotating and no rotating speed ratio (Duty %) outputting, the adjustable lowest rotating speed setting voltage signal (ALG) is set to be 1.75V to control the motor to keep in the lowest rotating speed. When the analog signal (VTH) is smaller than the voltage level 1.75V of the adjustable lowest rotating speed setting voltage signal (ALG), the rotating speed ratio (Duty %) is maintained in 20%. When the analog signal (VTH) is larger than the voltage level 1.75V of the adjustable lowest rotating speed setting voltage signal (ALG) (after Duty % is 36%), the output of the rotating speed ratio (Duty %) is linear change. In CASE2 condition, it is to observe the variation of the rotating speed curve when the Duty cycle is between 0% and 100%. According to FIG. 6A and FIG. 6B, when the analog signal (VTH) is 1.75V, the analog signal (VTH) is contacted the triangular signal (TRI) and the output rotating speed Duty % is existed when the analog signal (VTH) is 1.25V. Therefore, in CASE2 condition, the rotating speed ratio (Duty %) is outputted at the beginning, the motor will generate too much heat to increase the temperature. In order to satisfy the heat releasing request, the adjustable lowest rotating speed setting voltage signal (ALG) is set to be 2.25V to control the motor to keep in the lowest rotating speed to adjust the temperature. When the analog signal (VTH) is smaller than the voltage level 2.25V of the adjustable lowest rotating speed setting voltage signal (ALG), the duty cycle is maintained between 0%-25% and the rotating speed ratio (Duty %) is maintained in 40%. When the analog signal (VTH) is larger than the voltage level 2.25V of the adjustable lowest rotating speed setting voltage signal (ALG) (after Duty % is 25%), the output of the rotating speed ratio (Duty %) is linear change. According to the description above, the lowest rotating speed setting is added in the first embodiment to maintain the motor operating in the lowest rotating speed and the first embodiment can also be adjusted in accordance with the different motors and the different systems.

Figure 7A:
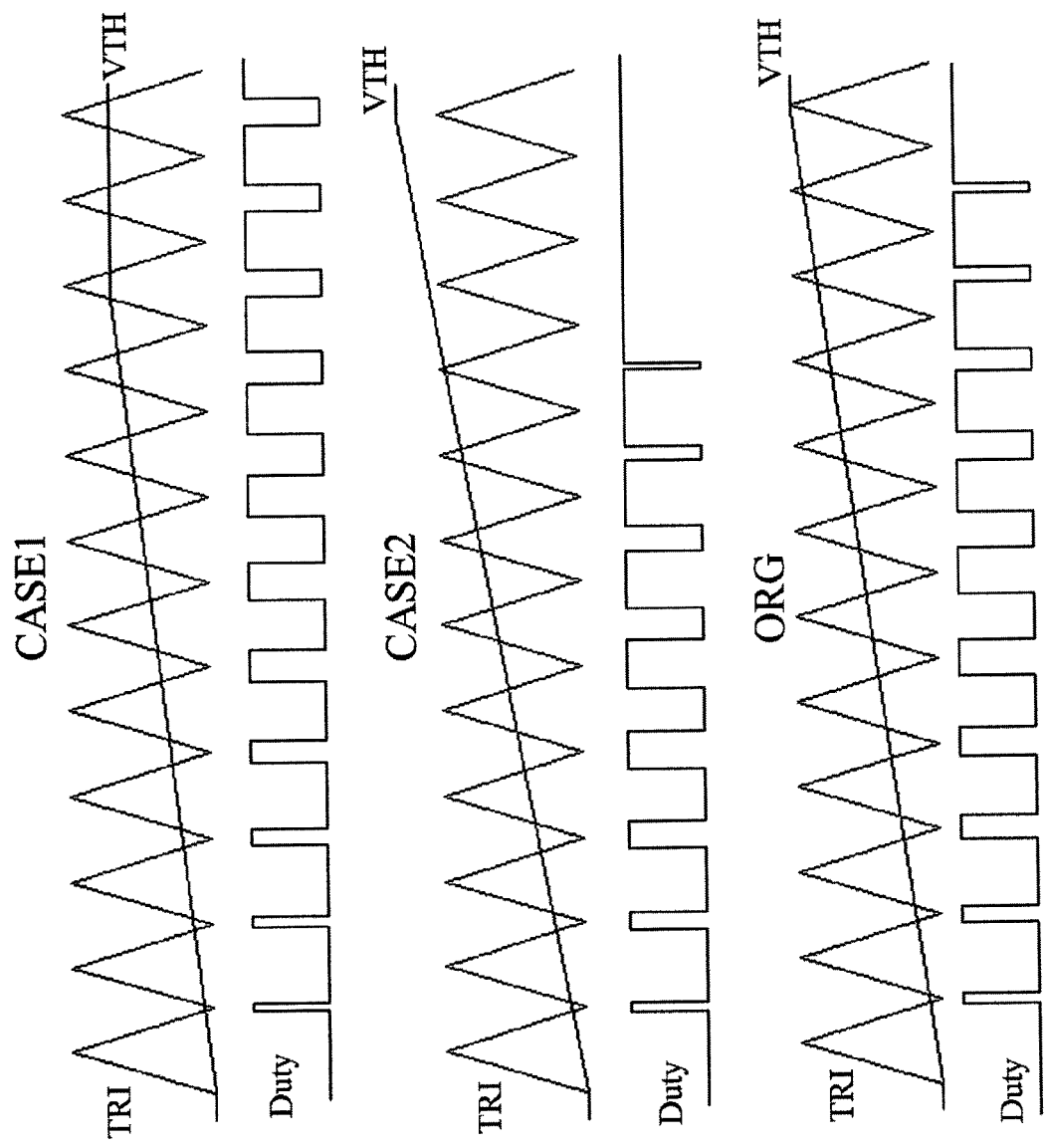
FIG. 7A is a waveform diagram in the second embodiment of the present invention.
Figure 7B:
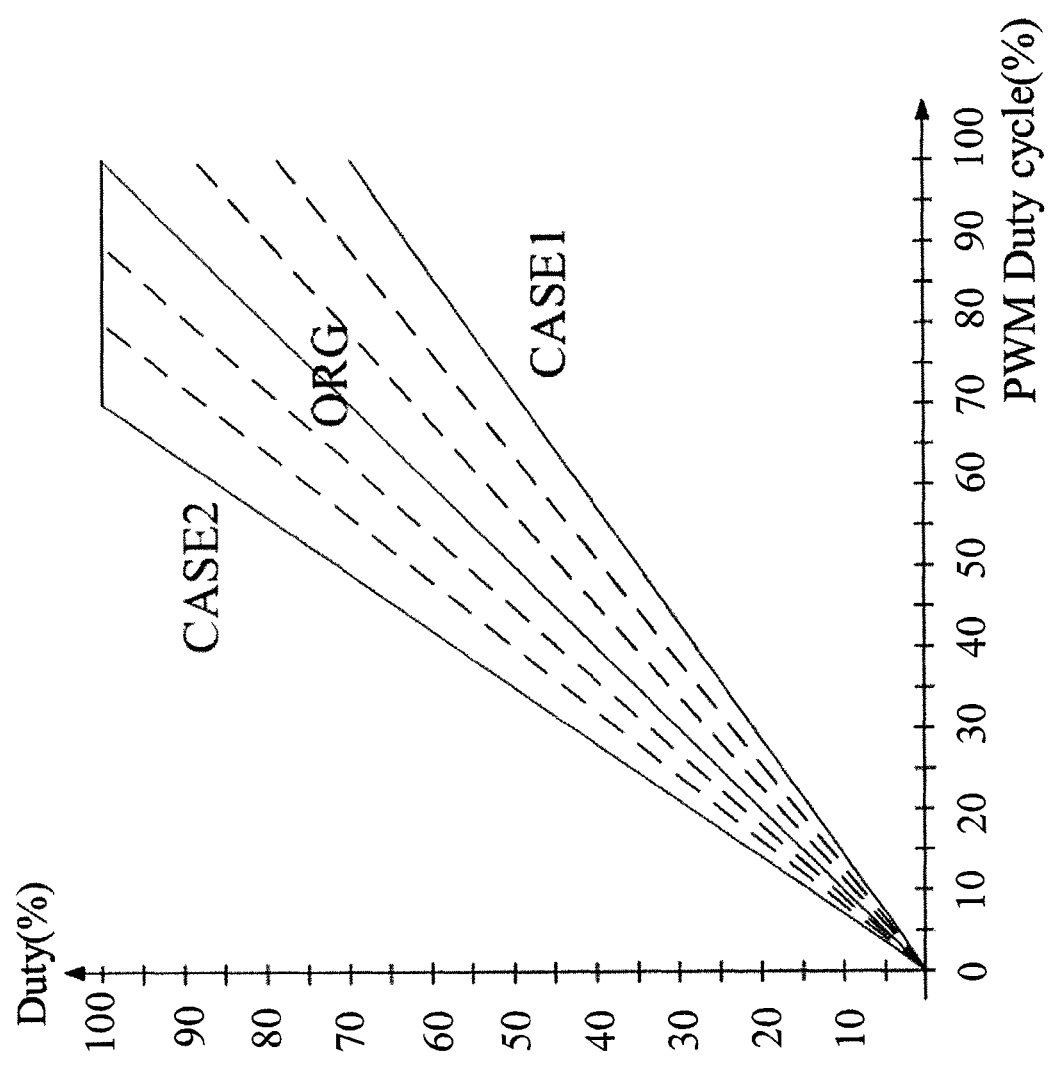
FIG. 7B is a rotating speed curve diagram in the second embodiment of the present invention.

Now, please refer to FIG. 7A, it is a waveform diagram illustrating in the second embodiment of the present invention. As shown in FIG. 7A, the high voltage and the low voltage of the triangular signal in the second embodiment is respectively fixed to be 3.75V and 1.25V and the adjustable lowest setting voltage (VL) is fixed to be 1.25V to adjust the adjustable highest setting voltage (VH). Therefore, that it is to divide into three conditions: ORG (VH=3.75V, VL=1.25V), CASE1 (VH=2.9V, VL=1.25V) and CASE2 (VH=5V, VL=1.25V) to describe the comparing result. Firstly, if it is in ORG (VH=3.75V, VL=1.25V) condition, the high voltage and the low voltage of the triangular signal is respectively fixed to be 3.75V and 1.25V and the adjustable highest setting voltage (VH) is 3.75V and the adjustable lowest setting voltage (VL) is 1.25V, the converting result of the analog signal (VTH) by the conversion equation is varied between 1.25V and 3.75V and the analog signal is compared with the triangular signal (TRI) to observe the output rotating Duty %. The result is shown in the ORG waveform view of FIG. 7A. Because the result of the analog signal (VTH) is the same as the high voltage and the low voltage of the triangular signal (TRI), the output rotating speed Duty % is leaner changes. Secondly, if it is in CASE1(VH=2.9V, VL=1.25V) condition, the high voltage and the low voltage of the triangular signal is respectively fixed to be 3.75V and 1.25V, the adjustable highest setting voltage (VH) is 2.9V and the adjustable lowest setting voltage (VL) is 1.25V, the converting result of the analog signal (VTH) by the conversion equation is varied between 1.25V and 2.9V and the analog signal is compared with the triangular signal (TRI) to observe the output rotating Duty %. The result is shown in the CASE1 waveform view of FIG. 7A. When the analog signal (VTH) is changed to be 1.25V to contact the triangular signal (TRI), the output rotating speed Duty % is started to generate. However, because the highest value of the analog signal is 2.9V, which is lower than the high voltage 3.75V of the triangular signal (TRI), the output rotating speed Duty % is smaller than the output rotating speed Duty % as the analog signal (VTH) is 3.75V in the ORG condition. In addition, if it is in CASE2(VH=5V, VL=1.25V) condition, the high voltage and the low voltage of the triangular signal is respectively fixed to be 3.75V and 1.25V, and the adjustable highest setting voltage (VH) is 5V and the adjustable lowest setting voltage (VL) is 1.25V, the converting result of the analog signal (VTH) by the conversion equation is varied between 1.25V and 5V and the analog signal is compared with the triangular signal (TRI) to observe the output rotating Duty %. The result is shown in the CASE2 waveform view of FIG. 7A. However, because the highest value of the analog signal is 5V, which is higher than the high voltage 3.75V of the triangular signal (TRI), the output rotating speed Duty % is larger than the output rotating speed Duty % as the analog signal (VTH) is 3.75V in the ORG condition. Thereafter, the three conditions ORG (VH=3.75V, VL=1.25V), CASE1 (VH=2.9V, VL=1.25V) and CASE2 (VH=5V, VL=1.25V) are converted to be a rotating speed curve in accordance with the Duty cycle of the controlling signal (PWM signal). Please refer to FIG. 7B and FIG. 7A in conjunction, as shown in FIG. 7B, it is a rotating speed curve diagram in the second embodiment of the present invention. The horizontal line axis is the Duty cycle % of the controlling signal (PWM signal) and the vertical line is the motor output rotating speed Duty %. In ORG condition, it is to observe the variation of the rotating speed curve when the Duty cycle is between 0% and 100%. As the description in FIG. 7A, the result of the analog signal (VTH) is the same as the high voltage and the low voltage of the triangular signal (TRI) and the motor output rotating speed curve is linear changes. Then, in CASE1 condition, it is to observe the variation of the rotating speed curve when the Duty cycle is between 0% and 100%. As the description in FIG. 7A, when the analog signal (VTH) is 1.25V, the analog signal (VTH) is contacted the triangular signal (TRI) and the output rotating speed Duty % is existed when the analog signal (VTH) is 1.25V. However, because the highest value of the analog signal is 2.9V, which is lower than the high voltage 3.75V of the triangular signal (TRI), the output rotating speed Duty % is smaller than the output rotating speed Duty % as the analog signal (VTH) is 3.75V in the ORG condition. As the CASE1 rotating speed curve in FIG. 7B, when the Duty cycle is 100%, the motor output rotating speed Duty % is 67%. In CASE2 condition, it is to observe the variation of the rotating speed curve when the Duty cycle is between 0% and 100%. As the description in FIG. 7A, when the analog signal (VTH) is 1.25V, the analog signal (VTH) is contacted the triangular signal (TRI) and the output rotating speed Duty % is existed when the analog signal (VTH) is 1.25V. However, because the highest value of the analog signal is 5V, which is higher than the high voltage 3.75V of the triangular signal (TRI), the output rotating speed Duty % is larger than the output rotating speed Duty % as the analog signal (VTH) is 3.75V in the ORG condition. As the CASE2 rotating speed curve, when the Duty cycle is 67%, the motor output rotating speed Duty % is 100%. In summary, the second embodiment can be implemented in different systems to adjust in accordance with motor heat dissipating ability on maximum speed area. When the heat dissipating ability is not required to be large enough, it is to adjust to the CASE1 setting. When the heat dissipating ability is required to be the maximum, it is to adjust to the CASE2 setting. When the temperature of the thermal fans in VGA or CPU is too high, it is to adjust the adjustable highest setting voltage (VH) to adjust the motor output at high rotating speed (as the dot line in FIG. 7B) to fast reduce the temperature of the fans. However, in order to fast reduce the temperature of the fans, the function of setting the lowest rotating speed is used to control the motor and achieve the heat releasing request to include power energy saving efficiency.

Figure 8A:
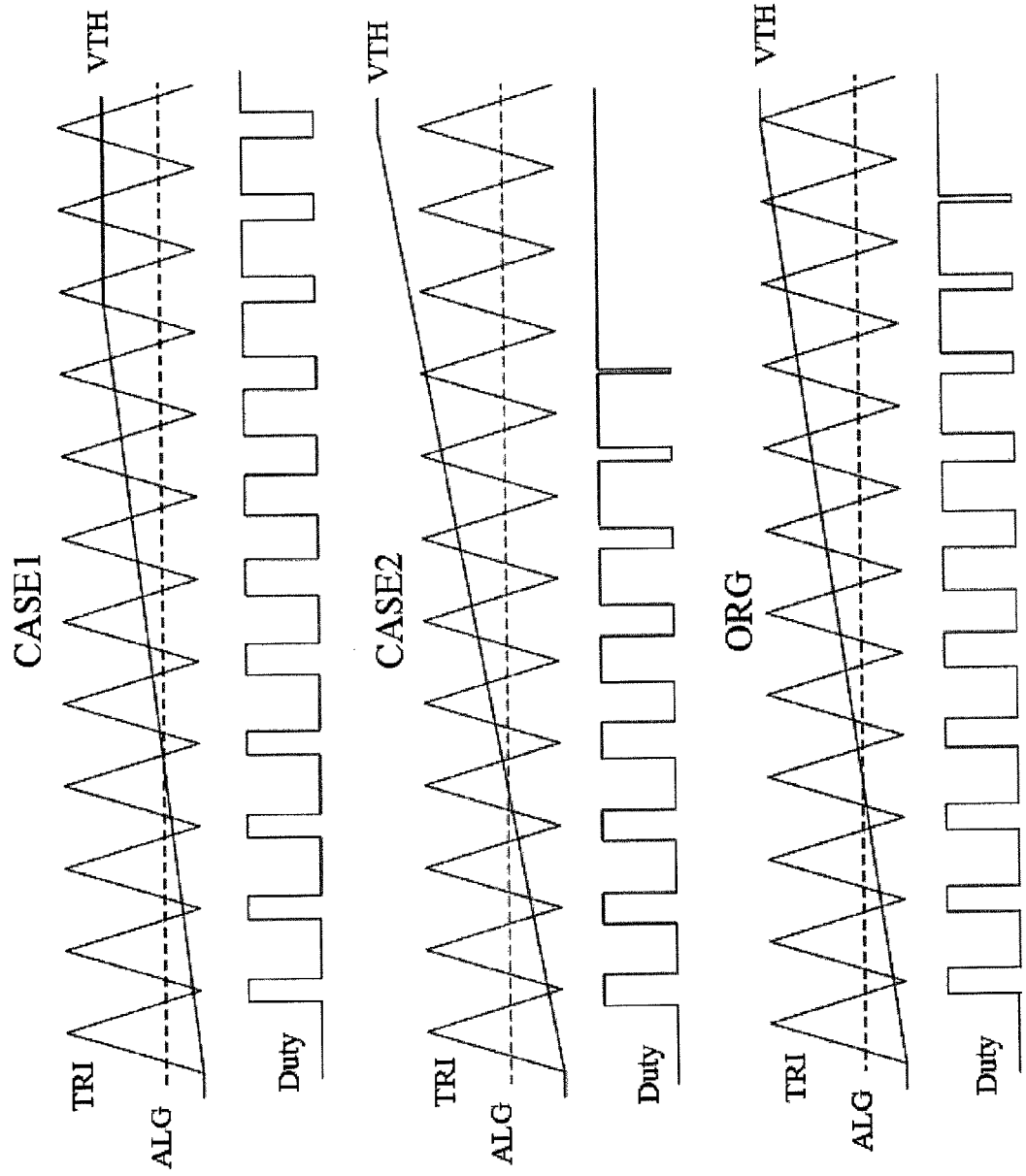
FIG. 8A is a waveform diagram in the second embodiment with an extra adjustable lowest rotating speed setting of the present invention.

Now, please refer to FIG. 8A, it is a waveform diagram illustrating the second embodiment includes an extra lowest rotating speed setting in the present invention. Obviously, the difference between FIG. 8A and FIG. 7A is: an adjustable lowest rotating speed setting voltage signal (ALG) is included in three conditions: ORG (VH=3.75V' VL=1.25V), CASE1 (VH=2.9V, VL=1.25V), CASE2 (VH=5V, VL=1.25V) and it is compared with the analog signal (VTH) converted by the converting equation and the triangular signal (TRI) to determine the output rotating speed ration (Duty %). As shown in FIG. 8A, if it is in ORG condition, the high voltage and the low voltage of the triangular signal is respectively fixed to be 3.75V and 1.25V, the adjustable highest setting voltage (VH) is 3.75V, the adjustable lowest setting voltage (VL) is 1.25V and the extra adjustable lowest rotating speed setting voltage signal (ALG) is 2V, the converting result of the analog signal (VTH) by the conversion equation is varied between 1.25V and 3.75V and the analog signal is compared with the triangular signal (TRI) and the extra adjustable lowest rotating speed setting voltage signal (ALG) to observe the output rotating Duty %. The result is shown in the ORG waveform view of FIG. 8A. Please refer to the ORG waveform diagram in FIG. 8A and the ORG waveform diagram in FIG. 7A in conjunction, because the result of the analog signal (VTH) is the same as the high voltage and the low voltage of the triangular signal (TRI), which is varied between 1.25V and 3.75, when the adjustable lowest rotating speed setting voltage signal (AL) is set to be 2V, the motor can be operated in the lowest rotating speed. Therefore, when the analog signal (VTH) is lowest than the voltage level 2V of the adjustable lowest rotating speed setting voltage signal (ALG), the rotating speed ration (Duty %) is outputted in accordance with the adjustable lowest setting voltage signal (ALG). When the analog signal (VTH) is larger than the voltage level 2V of the adjustable lowest setting voltage signal, the analog signal (VTH) is compared with the triangular signal (TRI) to output the rotating speed (Duty %) and the output rotating speed Duty % is leaner changes. Secondly, if it is in CASE1 condition, the high voltage and the low voltage of the triangular signal is respectively fixed to be 3.75V and 1.25V, the adjustable highest setting voltage (VH) is 2.9V, the adjustable lowest setting voltage (VL) is 1.75V and the adjustable lowest setting voltage signal (ALG) is 1.75V, the converting result of the analog signal (VTH) by the conversion equation is varied between 1.25V and 2.9V and the analog signal is compared with the triangular signal (TRI) and the extra adjustable lowest rotating speed setting voltage signal (ALG) to observe the output rotating Duty %. The result is shown in the CASE1 waveform view of FIG. 8A. Please refer to the CASE1 waveform in FIG. 8A and the CASE1 waveform in FIG. 7A in conjunction, the analog signal is contacted the triangular signal (TRI) when the analog signal is 1.25V and it is to output the rotating speed ratio (Duty %). Because the highest value of the analog signal (VTH) is 2.9V, which is lowest than the high voltage level 3.75V of the triangular signal (TRI), the output rotating speed ratio (Duty %) is smaller than the output rotating speed ration (Duty %) in ORG condition when the analog signal (VTH) is 3.75V. However, when the adjustable lowest rotating speed setting voltage signal (ALG) is set to be 1.75V, the motor can operate in the lowest rotating speed to satisfy the lowest heat releasing request. When the analog signal (VTH) is smaller than the voltage level 1.75V of the adjustable lowest rotating speed setting voltage signal (ALG), the adjustable lowest rotating speed setting voltage signal (ALG) is adjusted to output the rotating speed ration (Duty %). When the analog signal (VTH) is larger than the voltage level 1.75V of the adjustable lowest rotating speed setting voltage signal (ALG), it is compared with the analog signal (VTH) and the triangular signal (VTH) to output the rotating speed ration (Duty %) and the result is linear change. Moreover, when it is in CASE2 condition, the high voltage and the low voltage of the triangular signal is respectively fixed to be 3.75V and 1.25V, the adjustable highest setting voltage (VH) is 5V, the adjustable lowest setting voltage (VL) is 1.25V, the adjustable lowest rotating speed setting voltage signal (ALG) is 2.25V, and the converting result of the analog signal by the converting equation is varied between 1.25V and 5V, and the analog signal is compared with the triangular signal (TRI) and the adjustable lowest rotating speed setting voltage signal (ALG) to observe the output rotating Duty %. The result is shown in the CASE2 waveform view of FIG. 8A. Please refer to refer to CASE2 waveform view of FIG. 8A and the CASE2 waveform view of FIG. 7A, when the analog signal (VTH) is 1.25V, it is contacted the triangular signal (TRI). The voltage level thereof is the same as the lowest voltage 1.25V of the triangular signal (TRI). Therefore, in CASE2 condition, the rotating speed ration (Duty %) is outputted at the beginning. However, the highest value of the analog signal (VTH) is 5V larger than the high voltage level 3.75V of the triangular signal (TRI), the output rotating speed ratio (Duty %) is larger than the rotating speed ratio in ORG condition when the analog signal (VTH) is 3.75V. However, when the adjustable lowest rotating speed setting voltage signal (ALG) is set to be 2.25V, the motor can operate in the lowest rotating speed to satisfy the lowest heat releasing request. When the analog signal (VTH) is smaller than the voltage level 2.25V of the adjustable lowest rotating speed setting voltage signal (ALG), the adjustable lowest rotating speed setting voltage signal (ALG) is adjusted to output the rotating speed ration (Duty %). When the analog signal (VTH) is larger than the voltage level 2.25V of the adjustable lowest rotating speed setting voltage signal (ALG), it is compared with the analog signal (VTH) and the triangular signal (VTH) to output the rotating speed ration (Duty %) and the result is linear change.

Figure 8B:
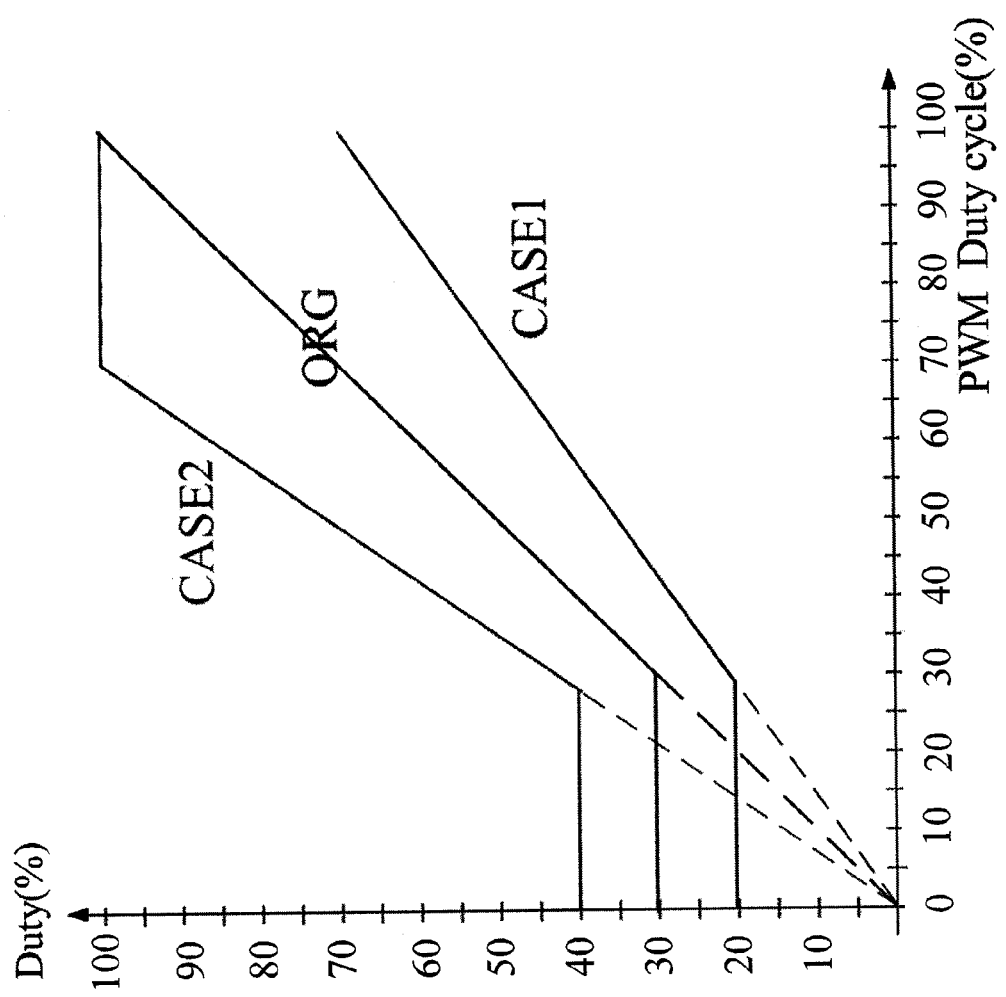
FIG. 8B is a rotating speed curve diagram in the second embodiment with an extra adjustable lowest rotating speed setting of the present invention.

Thereafter, the three conditions ORG (VH=3.75V, VL=1.25V), CASE1 (VH=2.9V, VL=1.25V) and CASE2 (VH=5V, VL=1.25V) are converted to be a rotating speed curve in accordance with the Duty cycle of the controlling signal (PWM signal). Please refer to FIG. 8B and FIG. 8A in conjunction, as shown in FIG. 8B, it is a rotating speed curve diagram in the second embodiment of the present invention. The horizontal axis is the Duty cycle % of the controlling signal (PWM signal) and the vertical axis is the motor output rotating speed Duty %. In ORG condition, it is to observe the variation of the rotating speed curve when the Duty cycle is between 0% and 100%. As the description in FIG. 8A and FIG. 8B in conjunction, the result of the analog signal (VTH) is the same as the high voltage and the low voltage of the triangular signal (TRI) and the motor output rotating speed curve is linear change. When the adjustable lowest rotating speed setting voltage signal (ALG) is set to be 2V, the motor is operated in the lowest rotating speed. When the analog signal (VTH) is smaller than the voltage level 2V of the adjustable lowest rotating speed setting voltage signal (ALG), the rotating speed ratio (Duty %) is maintained in 30%. In other words, the Duty cycle is between 0% and 30% and the rotating speed ratio (Duty %) is maintained in 30%. When the analog signal (VTH) is larger than the voltage level 2V of the adjustable lowest rotating speed setting voltage signal (ALG) (after Duty % is 30%), the output of the rotating speed ratio (Duty %) is linear change. Then, in CASE1 condition, it is to observe the variation of the rotating speed curve when the Duty cycle is between 0% and 100%. According to FIG. 8A and FIG. 8B, when the analog signal (VTH) is 1.25V, the analog signal (VTH) is contacted the triangular signal (TRI). The output rotating speed Duty % is existed at the beginning when the analog signal (VTH) is 1.25V. However, because the highest value of the analog signal is 2.9V, which is smaller than the high voltage 3.75V of the triangular signal (TRI), the output rotating speed Duty % is smaller than the output rotating speed Duty % as the analog signal (VTH) is 3.75V in the ORG condition. However, when the adjustable lowest rotating speed setting voltage signal (ALG) is set to be 1.75V, the motor can operate in the lowest rotating speed to satisfy the lowest heat releasing request. Therefore, when the analog signal (VTH) is smaller than the voltage level 1.75V of the adjustable lowest rotating speed setting voltage signal (ALG), the rotating speed ratio (Duty %) is maintained in 20%. In other words, when the Duty cycle is between 0% and 30.3%, the rotating speed ratio (Duty %) is maintained in 20%. When the analog signal (VTH) is larger than the voltage level 1.75V of the adjustable lowest rotating speed setting voltage signal (ALG) (after Duty % is 30.3%), the output of the rotating speed ratio (Duty %) is linear change. Moreover, if it is in CASE2 condition, it is to observe the variation of the rotating speed curve when the Duty cycle is between 0% and 100%. According to FIG. 8A and FIG. 8B, when the analog signal (VTH) is 1.25V, the analog signal (VTH) is contacted the triangular signal (TRI). The output rotating speed Duty % is existed at the beginning when the analog signal (VTH) is 1.25V. However, because the highest value of the analog signal is 5V, which is higher than the high voltage 3.75V of the triangular signal (TRI), the output rotating speed Duty % is larger than the output rotating speed Duty % as the analog signal (VTH) is 3.75V in the ORG condition. However, when the adjustable lowest rotating speed setting voltage signal (ALG) is set to be 2.25V, the motor can operate in the lowest rotating speed to satisfy the lowest heat releasing request. Therefore, when the analog signal (VTH) is smaller than the voltage level 2.25V of the adjustable lowest rotating speed setting voltage signal (ALG), the rotating speed ratio (Duty %) is maintained in 40%. In other words, when the Duty cycle is between 0% and 26.6%, the rotating speed ratio (Duty %) is maintained in 40%. When the analog signal (VTH) is larger than the voltage level 2.25V of the adjustable lowest rotating speed setting voltage signal (ALG) (after Duty % is 26.6%), the output of the rotating speed ratio (Duty %) is linear change. In summary, the adjustable lowest rotating speed setting voltage signal (ALG) is added in the second embodiment to keep the motor operating in the lowest rotating speed. The second embodiment can be varied in accordance with the different motors and the different system.

Figure 9A:
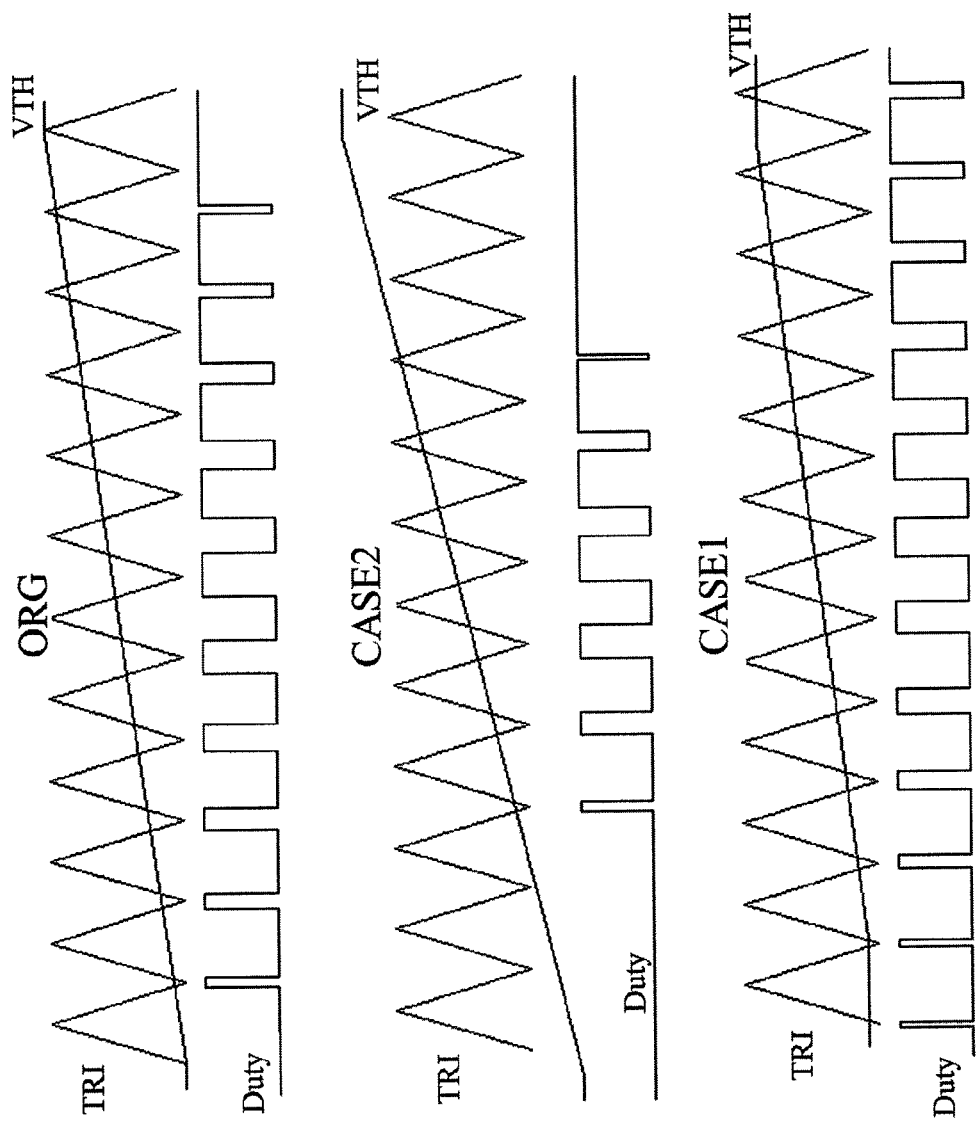
FIG. 9A is a waveform diagram in the third embodiment of the present invention.
Figure 9B:
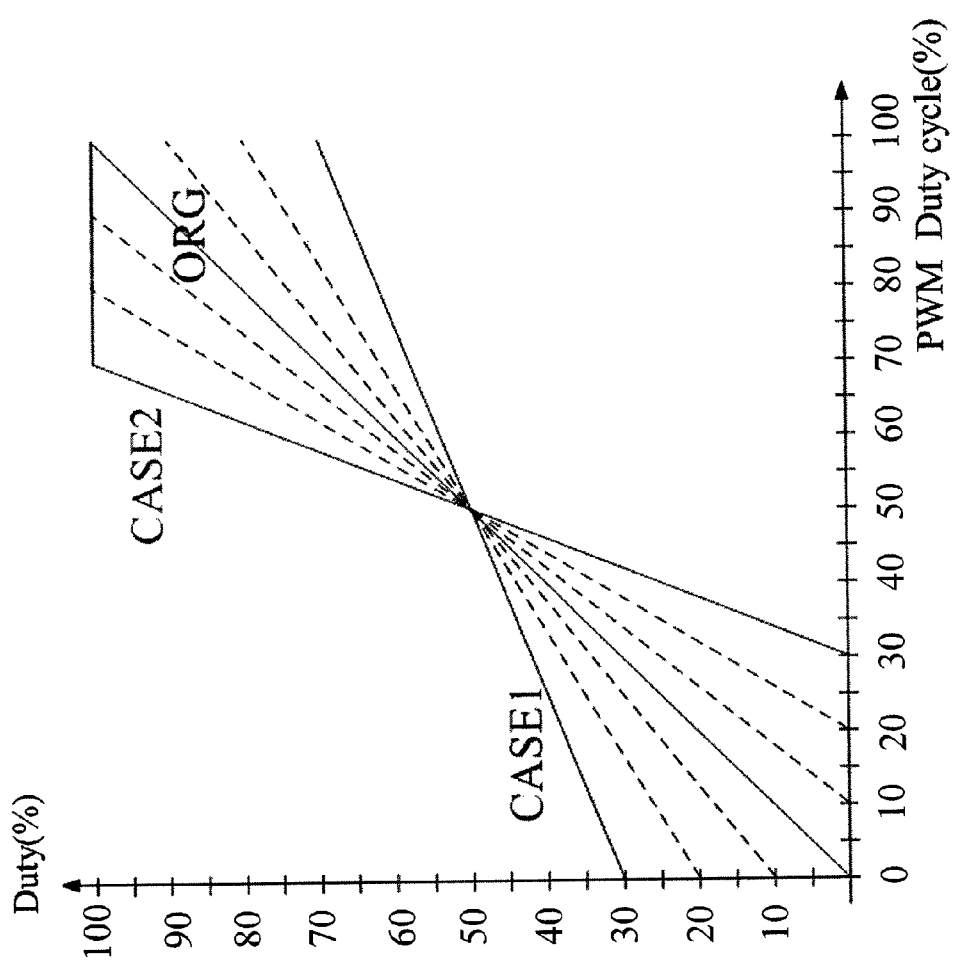
FIG. 9B is a rotating speed curve diagram in the third embodiment of the present invention.

Now, please refer to FIG. 9A, it is a waveform diagram illustrating in the third embodiment of the present invention. As shown in FIG. 9A, the high voltage and the low voltage of the triangular signal in the third embodiment is respectively fixed to be 3.75V and 1.25V to adjust the adjustable lowest setting voltage (VL) and the adjustable highest setting voltage (VH). The analog signal (VTH) generated by the conversion equation is compared with the triangular signal (TRI) to observe the output rotating speed Duty %. Therefore, it is to divide into three conditions: ORG (VH=3.75V, VL=1.25V), CASE1 (VH=3V, VL=2V) and CASE2 (VH=5V, VL=0V) to describe the comparing result. Firstly, if it is in ORG (VH=3.75V, VL=1.25V) condition, the high voltage and the low voltage of the triangular signal is respectively fixed to be 3.75V and 1.25V and the adjustable highest setting voltage (VH) is 3.75V and the adjustable lowest setting voltage (VL) is 1.25V, the converting result of the analog signal (VTH) by the conversion equation is varied between 1.25V and 3.75V and the analog signal is compared with the triangular signal (TRI) to observe the output rotating Duty %. The result is shown in the ORG waveform view of FIG. 9A. Because the result of the analog signal (VTH) is the same as the high voltage and the low voltage of the triangular signal (TRI), the output rotating speed Duty % is leaner changes. Secondly, if it is in CASE1(VH=3V, VL=2V) condition, the high voltage and the low voltage of the triangular signal is respectively fixed to be 3.75V and 1.25V, the adjustable highest setting voltage (VH) is 3V and the adjustable lowest setting voltage (VL) is 2V, the converting result of the analog signal (VTH) by the conversion equation is varied between 2V and 3V and the analog signal is compared with the triangular signal (TRI) to observe the output rotating Duty %. The result is shown in the CASE1 waveform diagram of FIG. 9A. When the analog signal (VTH) is changed to be 2V to contact the triangular signal (TRI), the output rotating speed Duty % is started to generate and the voltage level thereof is higher than the low voltage of the triangular signal (TRI). Therefore, the output rotating speed Duty % is larger than the output rotating speed Duty % as the analog signal (VTH) is 1.25V in the ORG condition. Because the highest value of the analog signal is 3V, which is lower than the high voltage 3.75V of the triangular signal (TRI), the output rotating speed Duty % is smaller than the output rotating speed Duty % as the analog signal (VTH) is 3.75V in the ORG condition. In addition, if it is in CASE2(VH=5V, VL=0V) condition, the high voltage and the low voltage of the triangular signal is respectively fixed to be 3.75V and 1.25V, and the adjustable highest setting voltage (VH) is 5V and the adjustable lowest setting voltage (VL) is 0V, the converting result of the analog signal (VTH) by the conversion equation is varied between 0V and 5V and the analog signal is compared with the triangular signal (TRI) to observe the output rotating Duty %. The result is shown in the CASE2 waveform diagram of FIG. 9A. Because the analog signal (VTH) is changed at 0V, the analog signal (VTH) is contacted the triangular signal (TRI) to output the rotating speed Duty % when analog signal (VTH) is 1.25V. However, because the highest value of the analog signal is 5V, which is higher than the high voltage 3.75V of the triangular signal (TRI), the output rotating speed Duty % is larger than the output rotating speed Duty % as the analog signal (VTH) is 3.75V in the ORG condition. Thereafter, the three conditions ORG (VH=3.75V, VL=1.25V), CASE1 (VH=3V, VL=2V) and CASE2 (VH=5V, VL=0V) are converted to be a rotating speed curve in accordance with the Duty cycle of the controlling signal (PWM signal). Please refer to FIG. 9B and FIG. 9A in conjunction, as shown in FIG. 9B, it is a rotating speed curve diagram in the third embodiment of the present invention. The horizontal line axis is the Duty cycle % of the controlling signal (PWM signal) and the vertical line is the motor output rotating speed Duty %. In ORG condition, it is to observe the variation of the rotating speed curve when the Duty cycle is between 0% and 100%. As the description in FIG. 9A, the result of the analog signal (VTH) is the same as the high voltage and the low voltage of the triangular signal (TRI) and the motor output rotating speed curve is linear changes. Then, in CASE1 condition, it is to observe the variation of the rotating speed curve when the Duty cycle is between 0% and 100%. As the description in FIG. 9A, when the analog signal (VTH) is 2V, the analog signal (VTH) is contacted the triangular signal (TRI) and the output rotating speed Duty % is existed when the analog signal (VTH) is 2V. The voltage level of the analog signal (VTH) is higher than the low voltage 1.25V of the triangular signal (TRI), and the output rotating speed Duty % thereof is larger than the output rotating speed as the analog signal (VTH) is 1.25V in the ORG condition. Moreover, the highest value of the analog signal (VTH) is lower than the high voltage 3.75V of the triangular signal (TRI), and the output rotating speed Duty % thereof is smaller than the output rotating speed Duty % as the analog signal is 3.75V in the ORG condition. As the CASE1 rotating speed curve in FIG. 9B, when the Duty cycle is 0%, the motor output rotating speed Duty % is 30% and when the Duty cycle is 100%, the motor output rotating speed Duty % is 70%. In CASE2 condition, it is to observe the variation of the rotating speed curve when the Duty cycle is between 0% and 100%. As the description in FIG. 9A, when the analog signal (VTH) is 1.25V, the analog signal (VTH) is contacted the triangular signal (TRI) and the output rotating speed Duty % is not existed when the analog signal (VTH) is 0V. Therefore, the output rotating speed Duty % will be existed when the analog signal (VTH) is 1.25V to contact the triangular signal (TRI). However, because the highest value of the analog signal is 5V, which is higher than the high voltage 3.75V of the triangular signal (TRI), the output rotating speed Duty % is larger than the output rotating speed Duty % as the analog signal (VTH) is 3.75V in the ORG condition. As the CASE2 rotating speed curve, when the Duty cycle is 67%, the motor output rotating speed Duty % is 100%. In summary, the third embodiment is to adjust the adjustable highest setting voltage (VH) and the adjustable lowest setting voltage (VL) to vary the output of the motor in high rotating speed and low rotating speed (as the dot line in FIG. 9B) so as to satisfy the different requirement of the motor in different application and increase the flexibility of the motor application.

Figure 10A:
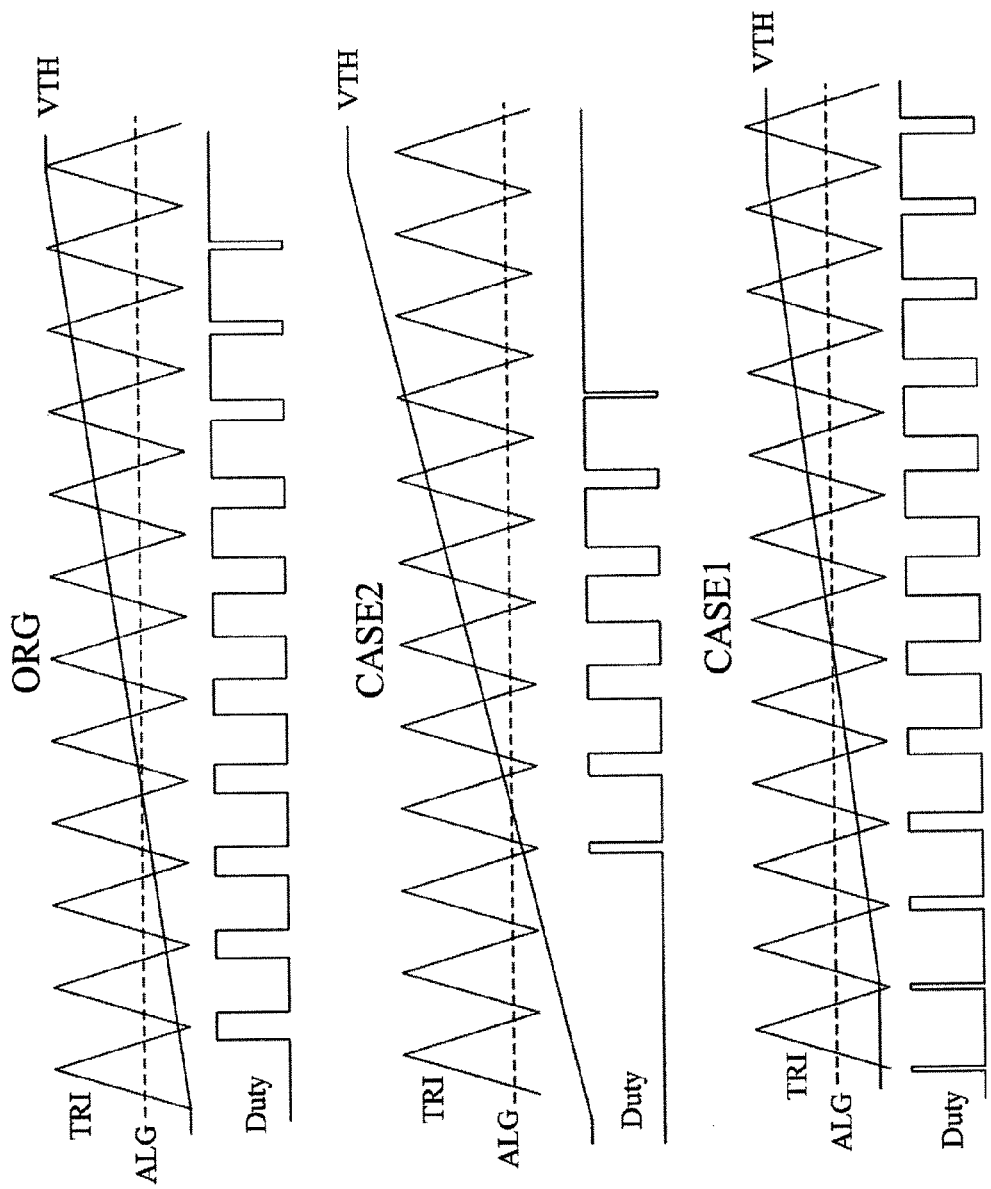
FIG. 10A is a waveform diagram in the third embodiment with an extra adjustable lowest rotating speed setting of the present invention.

Now, please refer to FIG. 10A, it is a waveform diagram illustrating the third embodiment includes an extra lowest rotating speed setting in the present invention. Obviously, the difference between FIG. 10A and FIG. 9A is an adjustable lowest rotating speed setting voltage signal (ALG) is included in three conditions: ORG (VH=3.75V, VL=1.25V), CASE1 (VH=3V, VL=2V), CASE2 (VH=5V, VL=0V) and it is compared with the analog signal (VTH) converted by the converting equation and the triangular signal (TRI) to determine the output rotating speed ration (Duty %). As shown in FIG. 10A, if it is in ORG condition, the high voltage and the low voltage of the triangular signal is respectively fixed to be 3.75V and 1.25V, the adjustable highest setting voltage (VH) is 3.75V, the adjustable lowest setting voltage (VL) is 1.25V and the extra adjustable lowest rotating speed setting voltage signal (ALG) is 2V, the converting result of the analog signal (VTH) by the conversion equation is varied between 1.25V and 3.75V and the analog signal is compared with the triangular signal (TRI) and the extra adjustable lowest rotating speed setting voltage signal (ALG) to observe the output rotating Duty %. The result is shown in the ORG waveform view of FIG. 10A. Please refer to the ORG waveform diagram in FIG. 10A and the ORG waveform diagram in FIG. 9A in conjunction, because the result of the analog signal (VTH) is the same as the high voltage and the low voltage of the triangular signal (TRI), which is varied between 1.25V and 3.75, when the adjustable lowest rotating speed setting voltage signal (AL) is set to be 2V, the motor can be operated in the lowest rotating speed. Therefore, when the analog signal (VTH) is lowest than the voltage level 2V of the adjustable lowest rotating speed setting voltage signal (ALG), the rotating speed ration (Duty %) is outputted in accordance with the adjustable lowest setting voltage signal (ALG). When the analog signal (VTH) is larger than the voltage level 2V of the adjustable lowest setting voltage signal, the analog signal (VTH) is compared with the triangular signal (TRI) to output the rotating speed (Duty %) and the output rotating speed Duty % is leaner changes. Secondly, if it is in CASE1 condition, the high voltage and the low voltage of the triangular signal is respectively fixed to be 3.75V and 1.25V, the adjustable highest setting voltage (VH) is 3V, the adjustable lowest setting voltage (VL) is 2V and the adjustable lowest setting voltage signal (ALG) is 2.25V, the converting result of the analog signal (VTH) by the conversion equation is varied between 2V and 3V and the analog signal is compared with the triangular signal (TRI) and the extra adjustable lowest rotating speed setting voltage signal (ALG) to observe the output rotating Duty %. The result is shown in the CASE1 waveform view of FIG. 10A. Please refer to the CASE1 waveform in FIG. 10A and the CASE1 waveform in FIG. 9A in conjunction, the analog signal is contacted the triangular signal (TRI) when the analog signal is 2V and it is to output the rotating speed ratio (Duty %). Because the highest value of the analog signal (VTH) is 3V, which is lowest than the high voltage level 3.75V of the triangular signal (TRI), the output rotating speed ratio (Duty %) is smaller than the output rotating speed ration (Duty %) in ORG condition when the analog signal (VTH) is 3.75V. However, when the adjustable lowest rotating speed setting voltage signal (ALG) is set to be 2.25V, the motor can operate in the lowest rotating speed to satisfy the lowest heat releasing request. When the analog signal (VTH) is smaller than the voltage level 2.25V of the adjustable lowest rotating speed setting voltage signal (ALG), the adjustable lowest rotating speed setting voltage signal (ALG) is adjusted to output the rotating speed ration (Duty %). When the analog signal (VTH) is larger than the voltage level 2.25V of the adjustable lowest rotating speed setting voltage signal (ALG), it is compared with the analog signal (VTH) and the triangular signal (VTH) to output the rotating speed ration (Duty %) and the result is linear change. Moreover, when it is in CASE2 condition, the high voltage and the low voltage of the triangular signal is respectively fixed to be 3.75V and 1.25V, the adjustable highest setting voltage (VH) is 5V, the adjustable lowest setting voltage (VL) is 0V, the adjustable lowest rotating speed setting voltage signal (ALG) is 1.75V, and the converting result of the analog signal by the converting equation is varied between 0V and 5V, and the analog signal is compared with the triangular signal (TRI) and the adjustable lowest rotating speed setting voltage signal (ALG) to observe the output rotating Duty %. The result is shown in the CASE2 waveform view of FIG. 10A. Please refer to refer to CASE2 waveform view of FIG. 10A and the CASE2 waveform view of FIG. 9A, when the analog signal (VTH) is varied from 0V and the analog signal (VTH) is 1.25, it is contacted the triangular signal (TRI) and the rotating speed ration (Duty %) is started to output. However, the highest value of the analog signal (VTH) is 5V larger than the high voltage level 3.75V of the triangular signal (TRI), the output rotating speed ratio (Duty %) is larger than the rotating speed ratio in ORG condition when the analog signal (VTH) is 3.75V. However, when the adjustable lowest rotating speed setting voltage signal (ALG) is set to be 1.75V, the motor can operate in the lowest rotating speed to satisfy the lowest heat releasing request. When the analog signal (VTH) is smaller than the voltage level 1.75V of the adjustable lowest rotating speed setting voltage signal (ALG), the adjustable lowest rotating speed setting voltage signal (ALG) is adjusted to output the rotating speed ration (Duty %). When the analog signal (VTH) is larger than the voltage level 1.75V of the adjustable lowest rotating speed setting voltage signal (ALG), it is compared with the analog signal (VTH) and the triangular signal (VTH) to output the rotating speed ration (Duty %) and the result is linear change.

Figure 10B:
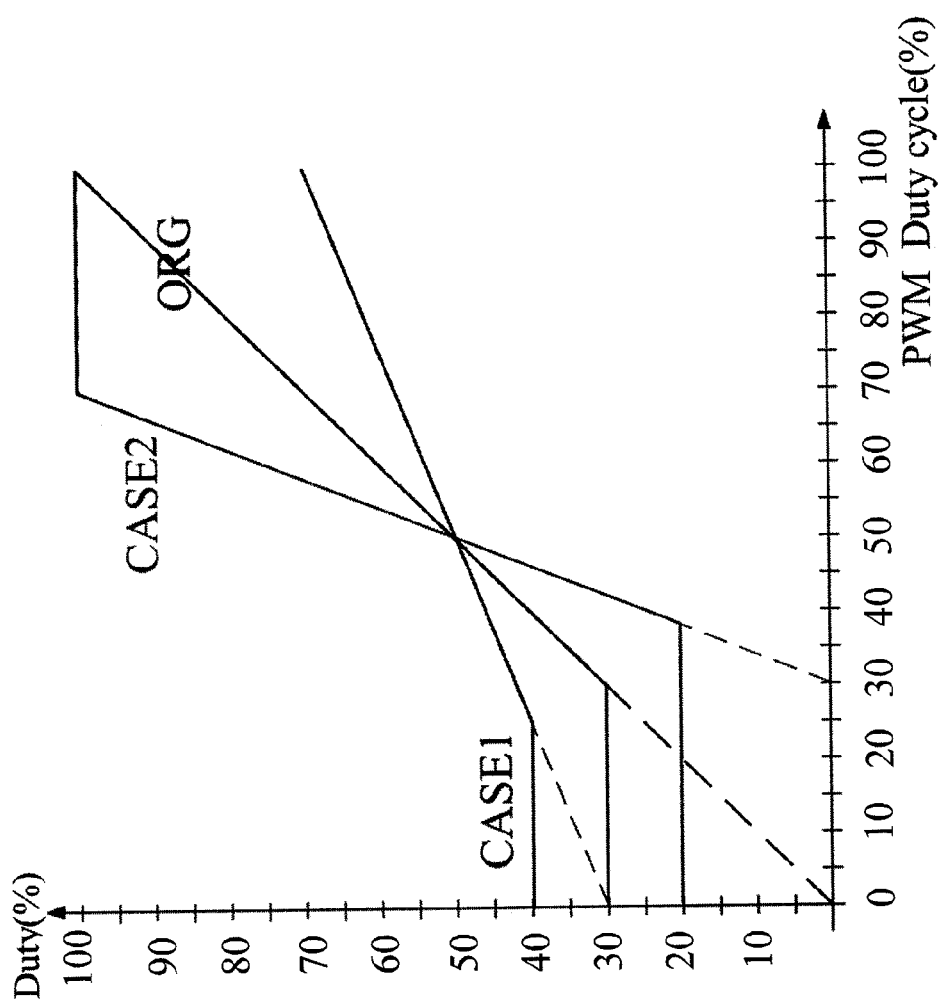
FIG. 10B is a rotating speed curve diagram in the third embodiment with an extra adjustable lowest rotating speed setting of the present invention.

Thereafter, the three conditions ORG (VH=3.75V, VL=1.25V), CASE1 (VH=3V, VL=2V) and CASE2 (VH=5V, VL=0V) are converted to be a rotating speed curve in accordance with the Duty cycle of the controlling signal (PWM signal). Please refer to FIG. 10B and FIG. 10A in conjunction, as shown in FIG. 10B, it is a rotating speed curve diagram in the second embodiment of the present invention. The horizontal axis is the Duty cycle % of the controlling signal (PWM signal) and the vertical axis is the motor output rotating speed Duty %. In ORG condition, it is to observe the variation of the rotating speed curve when the Duty cycle is between 0% and 100%. As the description in FIG. 10A and FIG. 10B in conjunction, the result of the analog signal (VTH) is the same as the high voltage and the low voltage of the triangular signal (TRI) and the motor output rotating speed curve is linear change. When the adjustable lowest rotating speed setting voltage signal (ALG) is set to be 2V, the motor is operated in the lowest rotating speed.

When the analog signal (VTH) is smaller than the voltage level 2V of the adjustable lowest rotating speed setting voltage signal (ALG), the rotating speed ratio (Duty %) is maintained in 30%. In other words, the Duty cycle is between 0% and 30% and the rotating speed ratio (Duty %) is maintained in 30%. When the analog signal (VTH) is larger than the voltage level 2V of the adjustable lowest rotating speed setting voltage signal (ALG) (after Duty % is 30%), the output of the rotating speed ratio (Duty %) is linear change. Then, in CASE1 condition, it is to observe the variation of the rotating speed curve when the Duty cycle is between 0% and 100%. According to FIG. 10A and FIG. 10B, when the analog signal (VTH) is 2V, the analog signal (VTH) is contacted the triangular signal (TRI). The output rotating speed Duty % is existed at the beginning when the analog signal (VTH) is 1.25V. However, because the highest value of the analog signal is 3V, which is smaller than the high voltage 3.75V of the triangular signal (TRI), the output rotating speed Duty % is smaller than the output rotating speed Duty % as the analog signal (VTH) is 3.75V in the ORG condition. However, when the adjustable lowest rotating speed setting voltage signal (ALG) is set to be 2.25V, the motor can operate in the lowest rotating speed to satisfy the lowest heat releasing request. Therefore, when the analog signal (VTH) is smaller than the voltage level 2.25V of the adjustable lowest rotating speed setting voltage signal (ALG), the rotating speed ratio (Duty %) is maintained in 40%. In other words, when the Duty cycle is between 0% and 25%, the rotating speed ratio (Duty %) is maintained in 40%. When the analog signal (VTH) is larger than the voltage level 2.25V of the adjustable lowest rotating speed setting voltage signal (ALG) (after Duty % is 25%), the output of the rotating speed ratio (Duty %) is linear change. Moreover, if it is in CASE2 condition, it is to observe the variation of the rotating speed curve when the Duty cycle is between 0% and 100%. According to FIG. 10A and FIG. 10B, when the analog signal (VTH) is 1.25V, the analog signal (VTH) is contacted the triangular signal (TRI). The output rotating speed Duty % is existed at the beginning when the analog signal (VTH) is 1.25V. However, because the highest value of the analog signal is 5V, which is higher than the high voltage 3.75V of the triangular signal (TRI), the output rotating speed Duty % is larger than the output rotating speed Duty % as the analog signal (VTH) is 3.75V in the ORG condition. However, when the adjustable lowest rotating speed setting voltage signal (ALG) is set to be 1.75V, the motor can operate in the lowest rotating speed to satisfy the lowest heat releasing request. Therefore, when the analog signal (VTH) is smaller than the voltage level 1.75V of the adjustable lowest rotating speed setting voltage signal (ALG), the rotating speed ratio (Duty %) is maintained in 40%. In other words, when the Duty cycle is between 0% and 35%, the rotating speed ratio (Duty %) is maintained in 40%. When the analog signal (VTH) is larger than the voltage level 1.75V of the adjustable lowest rotating speed setting voltage signal (ALG) (after Duty % is 35%), the output of the rotating speed ratio (Duty %) is linear change. In summary, the adjustable lowest rotating speed setting voltage signal (ALG) is added in the third embodiment to keep the motor operating in the lowest rotating speed. The second embodiment can be varied in accordance with the different motors and the different system. In summary, by adjusting the adjustable highest setting voltage (VH), the adjustable lowest setting voltage (VL) and the adjustable lowest rotating speed setting voltage signal, can achieve different duty cycle and the output of the rotating speed ratio (Duty %). This confirms the motor drive device of the present invention can be varied in accordance with the different motors (such as single-phase motors or three-phase motors), the different system (such as desktop or notebook) and the different heat dissipation needs (such as VGA fan, CPU fan or power supply fan).

Figure 11:
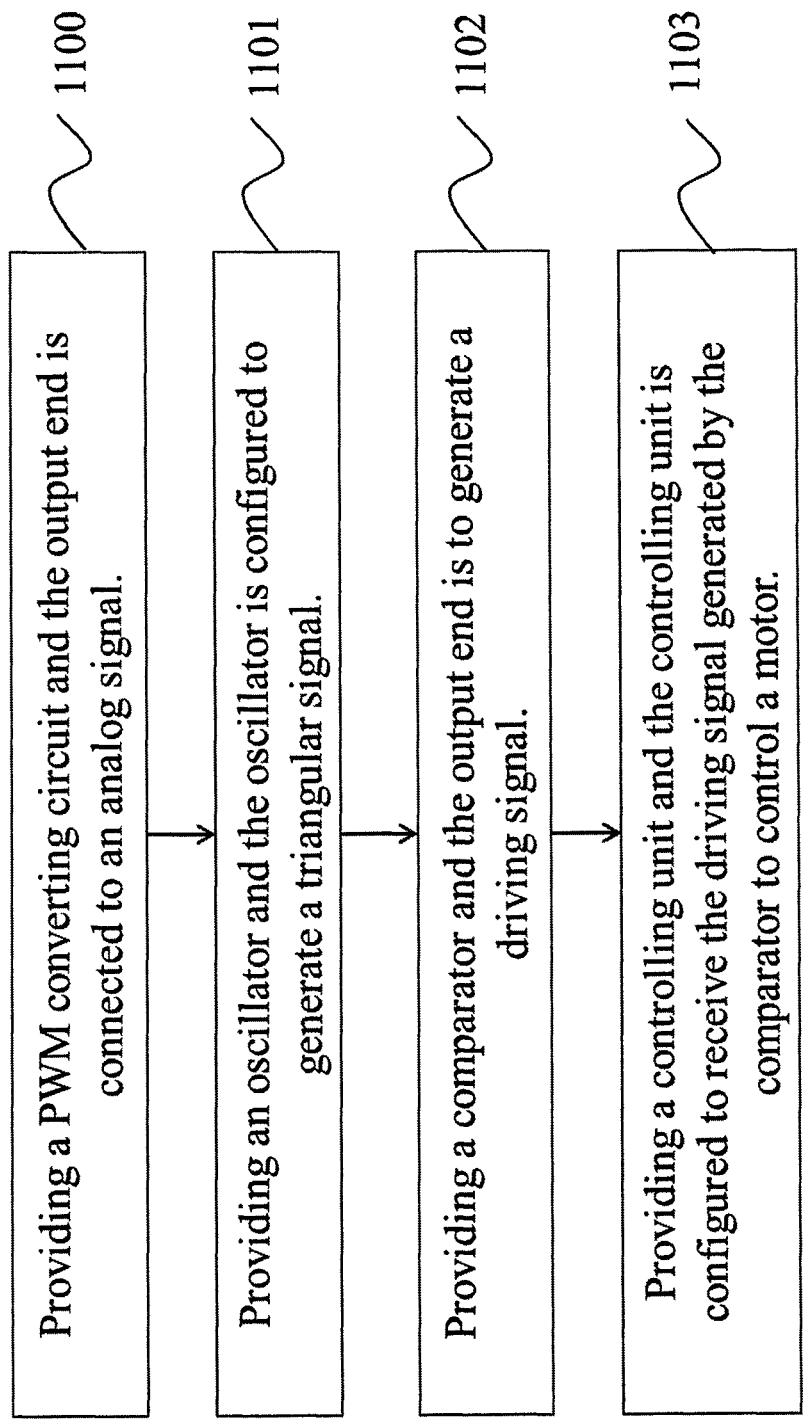
FIG. 11 is a flowchart illustrating the motor driving method in the present invention.

At final, please refer to FIG. 11, it is a flowchart illustrating the motor driving method in the present invention. As shown in FIG. 11, the motor driving method includes the following steps:

In step 1100, it is to provide a PWM converting circuit and the PWM converting circuit includes a first input end, a second input end, a third input end and an output end. The first input end is connected to a PWM signal. The second input end is connected to an adjustable highest setting voltage (VH). The third input is connected to an adjustable lowest setting voltage (VL). The output end is connected to an analog signal (VTH). The analog signal (VTH) is changeable by adjusting the PWM signal, the adjustable highest setting voltage (VH) or the adjustable lowest setting voltage (VL) and then it is going to step 1101.

In step 1101, it is to provide an oscillator and the oscillator is configured to generate a triangular signal. The triangular is adjustable between a high voltage level and a low voltage level and then it is going to step 1102. In step 1102, it is to provide a comparator and the comparator is configured to compare the analog signal (VTH) and the triangular signal (TRI) to generate a driving signal (S_DR) and then it is going to step 1102.

In step 1102, it is to provide a comparator and the comparator includes a first input, a second input, a third input and an output. The first input is connected to the triangular signal generated by the oscillator. The second input is connected to analog signal generated by the PWM converting circuit. The third input is to receive an adjustable lowest rotating speed setting voltage signal and the output end is to generate a driving signal (S_DR) and then it is going to step 1103.

In step 1103, it is to provide a controlling unit and the controlling unit is configured to receive the driving signal generated by the comparator to control a motor.

Although specific embodiments have been illustrated and described, it will be appreciated by those skilled in the art that various modifications may be made without departing from the scope of the present invention, which is intended to be limited solely by the appended claims.

What is claimed is:

1. A motor driving circuit for adjusting motor speed, comprising:
   a pulse width modulator (PWM) converting circuit includes a first input end, a second input end, a third input end and an output end, wherein the first input end is connected to a controlling signal, the second input end is connected to an adjustable highest setting voltage signal (VH), the third input end is connected to an adjust lowest setting voltage signal (VL) and the output end is to output an analog signal, and the analog signal is changeable in accordance with the controlling signal, the adjustable highest setting voltage signal (VH) or the adjust lowest setting voltage signal (VL);
   an oscillator configured to generate a triangular signal; and
   a comparator including a first input, a second input and an output, and the first input is connected to the triangular signal generated by the oscillator, the second input is connected to analog signal generated by the PWM converting circuit and the output end is to generate a driving signal.

2. The motor driving circuit according to claim 1, further comprising a controlling unit configure dot receive the driving signal to control a motor.

3. The motor driving circuit according to claim 2, wherein the motor is a single phase motor.

4. The motor driving circuit according to claim 2, wherein the motor is a three phase motor.

5. The motor driving circuit according to claim 1, wherein the PWM converting circuit further comprises:
   a first operating amplifier (OP1), and the OP1 includes a positive input end electrically connected to the adjustable highest setting voltage signal, a negative input end and an output end electrically connected to the negative input end;
   a second operating amplifier (OP2), and the OP2 includes a positive input end electrically connected to the adjustable lowest setting voltage signal, a negative input end and an output end electrically connected to the negative input end;
   a first switch (TG1), and the TG1 includes a first input end receiving a first input signal and connected to the OP1, an output end connected to the controlling signal, a controlling end connected to the controlling signal and a connecting end connected to a common node, and the TG1 is configured to determine if the first input signal is conducted in accordance with the controlling signal;
   a second switch (TG2), and the TG2 includes an input end receiving a second input signal and connected to the OP2, an output end connected to the output node, a controlling end connected to the controlling signal and a connecting end connected to the common node, and the TG2 is configured to determine if the second input signal is conducted in accordance with the controlling signal;
   an inverter including an input end configured to receive the controlling signal and an output end connected to the common node; and
   a low pass filter configured to convert a voltage generated by the first node to be the analog signal.

6. The motor driving circuit according to claim 5, wherein the TG1 and TG2 are transmitting gates.

7. The motor driving circuit according to claim 5, wherein the low pass filter further comprises:
   a first resistor (R1) including a first end connected to the output node and a second end;

a second resistor (R2) including a first end and a second end connected to the first resistor (R1);

a first capacitance (C1) including a first end connected to the second resistor (R2) and a second end connected to the ground;

a OP3 including a positive input end connected to the second resistor (R2), a negative input end and an output end connected to the negative input end; and a second capacitance (C2) including a first end connected to a node between the first resistor (R1) and the second resistor (R2) and a second end connected to the output end of the OP3.

8. The motor driving circuit according to claim 7, wherein the low pass filter is a two-step low pass filter.

9. The motor driving circuit according to claim 1, wherein the controlling signal is a PWM signal.

10. The motor driving circuit according to claim 1, wherein the triangular signal is adjustable between a high voltage level and a low voltage level.

11. The motor driving circuit according to claim 1, wherein the comparator further comprises the third input is to receive an adjustable lowest rotating speed setting voltage signal.

12. A motor driving method for adjusting a motor rotating speed, comprising:

providing a PWM converting circuit and the PWM converting circuit includes a first input end, a second input end, a third input end and an output end, wherein the first input end is connected to an PWM signal, the second input end is connected to an adjustable highest setting voltage (VH), the third input is connected to an adjustable lowest setting voltage (VL) and the output end is to output an analog signal;

providing a oscillator to generate a triangular signal; and providing a comparator and the comparator includes a first input, a second input and an output. The first input is connected to the triangular signal generated by the oscillator. The second input is connected to analog signal generated by the PWM converting circuit. And the output end is to generate a driving signal;

wherein the analog signal can be changed by adjusting the PWM signal, the adjustable highest setting voltage (VH) or the adjustable lowest setting voltage (VL).

13. The motor driving circuit according to claim 12, further comprising step of providing a control unit configured to receive the driving signal to control a motor.

14. The motor driving method according to claim 13, wherein the motor is a single phase motor or a three phase motor.

15. The motor driving circuit according to claim 12, wherein the PWM converting circuit further comprises:

a first operating amplifier (OP1), and the OP1 includes a positive input end electrically connected to the adjustable highest setting voltage signal, a negative input end and an output end electrically connected to the negative input end;

a second operating amplifier (OP2), and the OP2 includes a positive input end electrically connected to the adjustable lowest setting voltage signal, a negative input end and an output end electrically connected to the negative input end;

a first switch (TG1), and the TG1 includes a first input end receiving a first input signal and connected to the OP1, an output end connected to the controlling signal, a controlling end connected to the controlling signal and a connecting end connected to a common node, and the TG1 is configured to determine if the first input signal is conducted in accordance with the controlling signal;

a second switch (TG2), and the TG2 includes an input end receiving a second input signal and connected to the OP2, an output end connected to the output node, a controlling end connected to the controlling signal and a connecting end connected to the common node, and the TG2 is configured to determine if the second input signal is conducted in accordance with the controlling signal;

an inverter including an input end configured to receive the controlling signal and an output end connected to the common node; and a low pass filter configured to convert a voltage generated by the first node to be the analog signal.

16. The motor driving method according to claim 15, wherein the TG1 and TG2 are transmitting gates.

17. The motor driving method according to claim 15, wherein the low pass filter further comprises:

a first resistor (R1) including a first end connected to the output node and a second end;

a second resistor (R2) including a first end and a second end connected to the first resistor (R1);

a first capacitance (C1) including a first end connected to the second resistor (R2) and a second end connected to the ground;

a OP3 including a positive input end connected to the second resistor (R2), a negative input end and an output end connected to the negative input end; and a second capacitance (C2) including a first end connected to a node between the first resistor (R1) and the second resistor (R2) and a second end connected to the output end of the OP3.

18. The motor driving method according to claim 17, wherein the low pass filter is a two-step low pass filter.

19. The motor driving method according to claim 12, wherein the triangular signal is adjustable between a high voltage level and a low voltage level.

20. The motor driving method according to claim 12, wherein the comparator further comprises the third input is to receive an adjustable lowest rotating speed setting voltage signal.

* * * * *